United States Patent
Berrel et al.

(10) Patent No.: US 10,544,926 B2
(45) Date of Patent: Jan. 28, 2020

(54) HEADLAMP HAVING A RIGID/SEMI RIGID HEADBAND

(71) Applicant: Zedel, Crolles (FR)

(72) Inventors: Philippe Berrel, La Chapelle de Bard (FR); Boris Bouffay, Saint Hilaire du Touvet (FR); Sebastien Jarzac, Tencin (FR); Laurent Fruh, Chapareillan (FR)

(73) Assignee: Zedel, Crolles (FR)

( * ) Notice: Subject to any disclaimer, the term of this patent is extended or adjusted under 35 U.S.C. 154(b) by 6 days.

(21) Appl. No.: 15/688,463

(22) Filed: Aug. 28, 2017

(65) Prior Publication Data
US 2018/0058669 A1  Mar. 1, 2018

(30) Foreign Application Priority Data

Aug. 29, 2016 (FR) .................................... 16 01270

(51) Int. Cl.
| F21V 21/084 | (2006.01) |
| F21L 4/02 | (2006.01) |
| F21V 21/30 | (2006.01) |
| F21V 23/04 | (2006.01) |
| F21V 8/00 | (2006.01) |

(Continued)

(52) U.S. Cl.
CPC .............. F21V 21/084 (2013.01); F21L 4/02 (2013.01); F21V 21/30 (2013.01); F21V 23/0414 (2013.01); G02B 6/0005 (2013.01); *F21V 21/145* (2013.01); *F21Y 2101/00* (2013.01); *F21Y 2115/10* (2016.08)

(58) Field of Classification Search
USPC ........................................................ 362/105
See application file for complete search history.

(56) References Cited

U.S. PATENT DOCUMENTS

| 2007/0177376 A1* | 8/2007 | Simoni ..................... F21L 4/00 |
| | | 362/157 |
| 2008/0298048 A1 | 12/2008 | Garrity et al. |
| 2009/0323317 A1* | 12/2009 | Spartano ............... F21V 14/065 |
| | | 362/105 |

FOREIGN PATENT DOCUMENTS

| CN | 103216793 | 7/2013 |
| FR | 2 971 037 | 8/2012 |

OTHER PUBLICATIONS

French Search Report, National Appl. No. FR1601270, Applicant: Zedel, End of Search Date: Jun. 22, 2017, 6 pgs, and English language translation, 6 pgs.

* cited by examiner

Primary Examiner — Rafferty D Kelly
(74) Attorney, Agent, or Firm — Saile Ackerman LLC; Stephen B. Ackerman

(57) ABSTRACT

A headlamp is disclosed with a lamp fitted with a light source; a headband allowing the fastening of the headlamp over the head of a user, where the headband has a constant length, symmetrical with respect to a median sagittal plane. The headband also has an alternation of rigid/semi rigid elements for allowing a deformation in the space and the adjustment on the user's head is presented. In addition, the headband has a rigid/semi-rigid front section allowing a certain deformability along a first plane (x, y), a rigid/semi-rigid intermediate section allowing a certain deformability along a second plane (x, z) and a rigid/semi-rigid rear section allowing a certain deformability along a third plane (y, z). The headband has elements for the attachment and the passage of an elastic link for constraining the deformation of the rigid/semi rigid headband within the three planes.

22 Claims, 22 Drawing Sheets

(51) Int. Cl.
*F21Y 101/00* (2016.01)
*F21V 21/14* (2006.01)
*F21Y 115/10* (2016.01)

HEADLAMP HAVING A RIGID/SEMI RIGID HEADBAND

TECHNICAL FIELD

The present invention relates to the field of portable electrical lamps, and more particularly to a headlamp fitted with a rigid or semi rigid headband.

BACKGROUND

Headlamps, such as those originally used by miners, are subject to a great success in the filed of leisure activities, including caving and hiking. They are also widely used professionally.

In general, a headlamp comprises the combination of a lamp and a headband which is elastic and which ensures that the lamp is properly held on the head of a user with optimum comfort.

Although the headlamps have evolved significantly over the last few years, this evolution has focused mainly on the lamp itself: its power, its autonomy, its control electronics, etc. On the other hand, the elastic band which allows it to be held on the user's head has remained outside those evolution . . . . It is true that the function of "head holding" which has been properly provided by the conventional elastic headbands, does not invite to consider any fundamental change to what has been considered for decades as a simple accessory of a "basic tool". In this context, the headband has, for long, been considered as a minor accessory.

SUMMARY

It can be assumed that headlamps are likely to grow rapidly and become devices which will be widely spread in the general public. In that respect, it can be believed that the consumers will pay more attention and interest to select and use "their" own headlamp, meeting their particular needs, whatever they are.
In this respect, it is likely that these consumers will be able to be attracted by a "disruptive" design of headlamps which will have to be more ergonomic, more aesthetic and more functional. According to the known adage according to which what is beautiful is functional and reciprocally.

The present invention aims to provide such a "disruptive" evolution in the design of a headband providing proper holding of a headlamp on the user's head.

It is a first object of the present invention to provide a headlamp fitted with a new type of rigid/semi rigid headband which allows wide new possibilities of adjustment of diverse user's heads, and even on a safety helmet.

It is another object of the present invention to carry out a headlamp fitted with a headband of a new style and ergonomy, closer to the user's anatomy and providing greater comfort.

It is a third object of the present invention to carry out a headlamp showing new aesthetic look which is particularly attractive, meeting the expectations of new categories of end users.

It is another object of the present invention to carry out a headlamp which is fitted with a headband providing new functionalities, and particularly allowing the integration of electrical wirings powering the lamp.

It is a fifth object of the present invention to achieve a headlamp which is fitted with a headband facilitating the integration of a battery or a rear signaling at the headband.

It is still another object of the present invention to carry out a headlamp which is fitted with a headband providing a new ergonomic use, such as a "necklace" and/or table/floor lamp, with a capability of wide adjustment of the light beam.

These and other objects are achieved by a headlamp comprising:
  a lamp fitted with a light source;
  a headband allowing the fastening of the headlamp over the head of a user, characterized in that the headband has a constant length, symmetrical with respect to a median sagittal plane, and further comprises an alternation of rigid/semi rigids elements for allowing a deformation in the space and the adjustment on the user's head.

More particularly, the headband comprises:
  a rigid/semi-rigid front section allowing a certain deformability along a first plane (x, y);
  a rigid/semi-rigid intermediate section allowing a certain deformability along a second plane (x, z);
  a rigid/semi-rigid rear section allowing a certain deformability along a third plane (y, z);
wherein said headband comprises elements configured for the attachment and the passage of an elastic link for constraining the deformation of the rigid/semi rigid headband within the three planes.

Such unique structure allows the headband to present quite effective possibilities of deformation while maintaining constant the length and offers a new look and style as well as new functionalities too.

Moreover, as will be seen hereinafter, the new headband provide an exceptional capacity of adjustment on different heads, varying in a range of up to 19 cms, and may even be used on a safety helmet.

Preferably, the headband is configured for allowing, at the rear, the fixing of a battery pack for supplying current to the light source.

Alternatively, the headband can be configured for receiving, at its rear part, a rear signaling light.

Most advantageously, the headband is configured to present a hollow section so as to allow the incorporation of a plurality of electrical conductors for powering the light source and/or the control of the functionalities of the lamp.

Alternatively, the headband is configured to incorporate one or more optical fibers for deviating to the rear, to the front and even to the side, part of the light generated by the light source.

In one preferred embodiment, the rigid sections of the headband are configured to receive switches and/or a display for the control of the functionalities of the headlamp.

Preferably, the lamp is affixed on the front section of the headband and is fitted with at least one pivot allowing a rotation on said front section of the headband. The pivot is configured to allow a rotation of at least 180 degrees. Therefore, the pivot allows the adjustment of the light beam for providing a horizontal light beam, and even a downward light beam, when the headlamp is carried as a neck strap or a necklace.

BRIEF DESCRIPTION OF THE DRAWINGS

Other features of one or more embodiments of the invention will appear from the following description of embodiments of the invention, with reference being made to the accompanying drawings.

FIG. 12a shows a detail of an rigid section of the fourth embodiment allowing an tightening elastic link to pass there through.

DESCRIPTION

One will now describe in detail some embodiments of a headlamp with a comfortable headband presenting a new look, a new disruptive style for a holding device which are clearly intended to break with the conventional headbands. Beyond aesthetics and style, the new headband brings, as will be seen hereafter in detail, numerous new technical functionalities and in particular a facilitated integration of the electrical wirings inside the headband and also new possibilities of use, Notably as a "necklace/neckstrap" and even in table lamp.

In order to achieve this "break" with respect to the conventional headbands, the inventors sought to abstract from the conventional elastic band, of variable length, to ensure the adjustment of the headband to the various dimensions and sizes of user heads. They thus elaborated a new headband, which is based on a combination of rigid/semi-rigid sections of constant length and belonging to a family of three-dimensional shapes capable of deforming in space in several planes.

Figure 1:
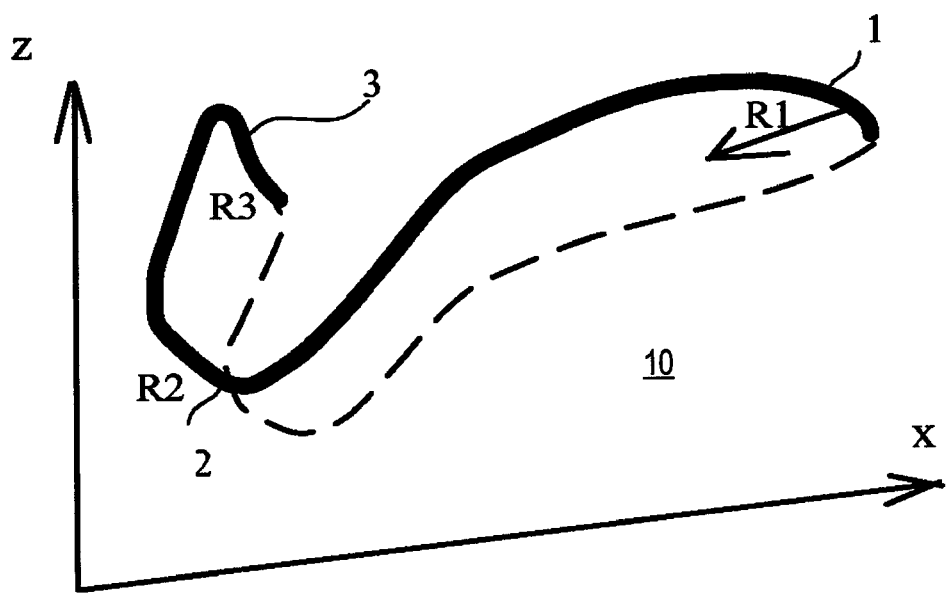
FIG. 1 illustrates a first embodiment of a rigid/semi rigid headband for a headlamp which allows deformation within three distinctive planes xz, xy and yz.
Figure 1:
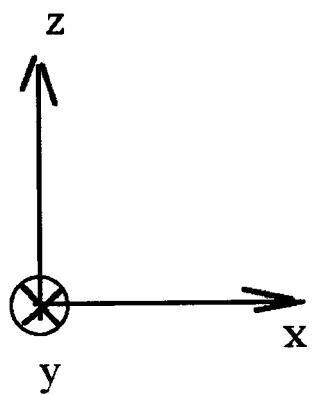

FIG. 1 illustrates the three-dimensional plot of a first embodiment of a rigid/semi-rigid headband 10 of a headlamp which offers possibilities of three-dimensional deformations, while keeping a constant length in space and in particular three Planes xz, xy and yz. In particular, it can be seen that the headband takes the form of a tubular support, which is symmetrical with respect to a plane (x, z) corresponding approximately to a median sagittal plane for the lamp holder (and shown in FIG. 2). The first embodiment, shown schematically in FIG. 1, shows a rigid/semi-rigid (but deformable) front section 1 on which the lamp will be affixed and which is approximately located in a horizontal plane (x, y) corresponding to a plane transverse to the lamp holder. As a first approximation, the radius of curvature R1 of the curve 1 which lies in the plane (x, y) is represented.

Behind the front section, represented at the left side of FIG. 1—one sees that the tracing of the headband 10 comprises a curve 2 which is approximately in a vertical plane (x, z) which is parallel to the sagittal plane of the lamp holder. In this plane, the headband follows a curve which, as a first approximation, includes a radius of curvature represented by R2 in FIG. 1.

With respect to the rear section of the headband, the latter follows a curve 3 which is rather inscribed in a plane (y, z) which corresponds to a frontal plane with respect to the lamp holder and one can again see that, in a first approximation, the curve in which the headband is inscribed shows a radius of "curvature" equal to R3.

As shown in FIG. 1 showing the symmetry of the curve, the dashed line corresponds to the part of the (left) headband which is situated "hidden" and behind the sagittal plane (x, z) which is the plane of symmetry.

It can be seen that the rear part of the first embodiment of the band "rises up" before joining the median sagittal plane, contrary to a second embodiment which will be described with reference to FIG. 3, and which shows a rear portion which "goes down".

As it can be seen in this first embodiment, the headband thus comprises:

A rigid/semi-rigid front section 1 allowing a certain deformability along a first plane (x, y) which is a transverse plane;

A rigid/semi-rigid intermediate section 2 allowing a certain deformability along a second plane (x, z) which is a sagittal plane;

A rigid/semi-rigid rear section 3 allowing a certain deformability along a third plane (y, z) which is a frontal plane.

Thanks to this advantageous arrangement, a three-dimensional shape is obtained which is deformable, within each of the above planes, whilst making it possible to keep the tubular shape headband a constant length which will prove to be particularly advantageous, as will be seen later. In other words, although remaining constant in length, it is the deformation of the three curves in the different planes, namely the variation of the radii of curvatures R1, R2 and R3, which now allows the headband to be closely adjusted on a user's head of any shape and size.

Figure 2:
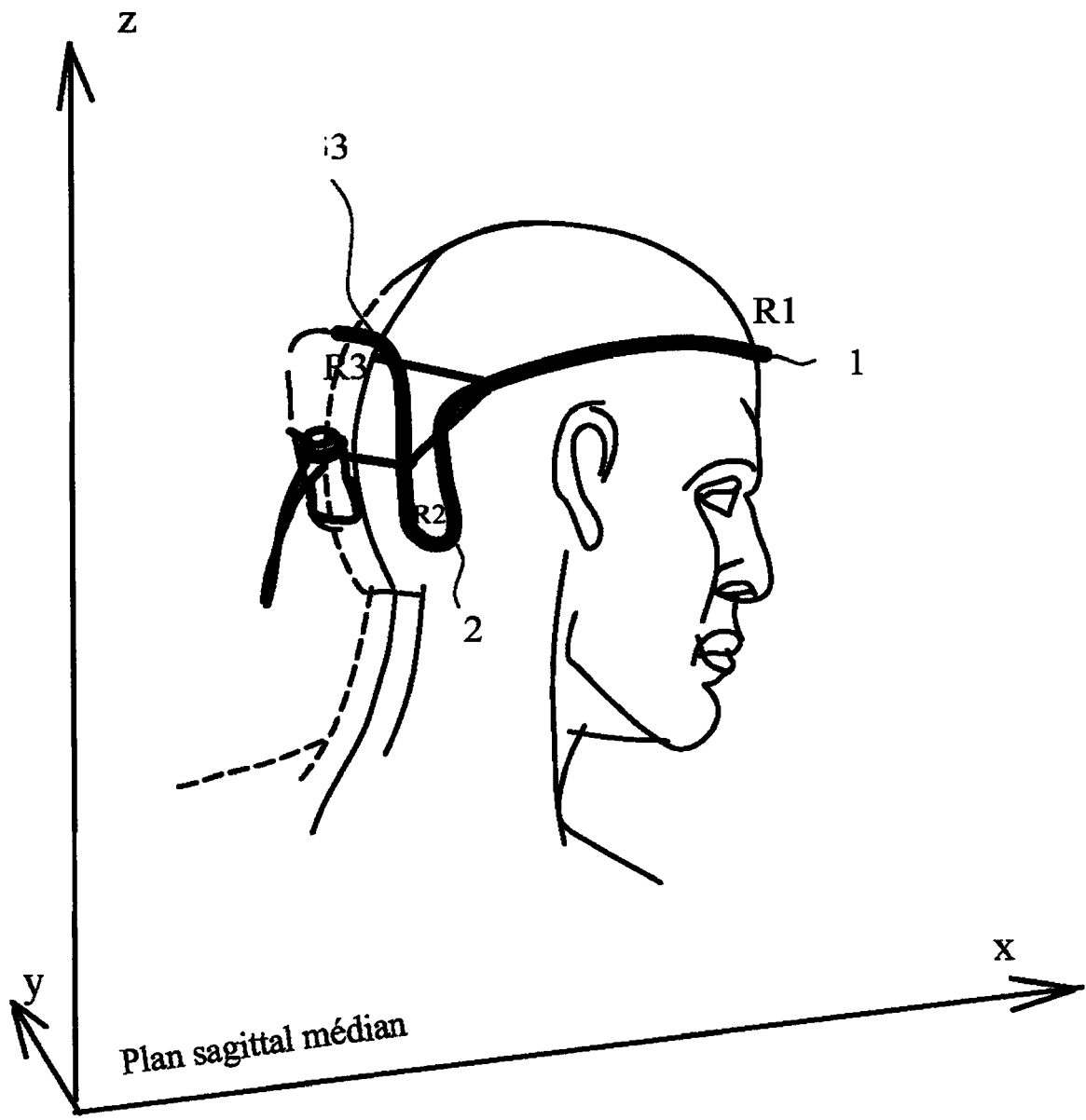
FIG. 2 illustrates how to position the headband of the first embodiment on the user's head.

More specifically, the headband according to the first embodiment comprises a combination of rigid/semi-rigid elements having different characteristics (grades), making it possible to produce the shape illustrated in FIG. 1. In addition, the headband comprises some elements being more rigid allowing the fixing and the passage of a tightening elastic link making it possible to constrain the deformation of the rigid/semi-rigid headband along the three planes, as this is shown in FIG. 2 showing a rear perspective view of a user, which head receives the headband of FIG. 1. In the new rigid/semi-rigid headband which is shown in the figure, the function of the tightening elastic link, having a variable length, is clearly separated from the function of the headband which, itself, has a length which remains constant.

Figure 3:
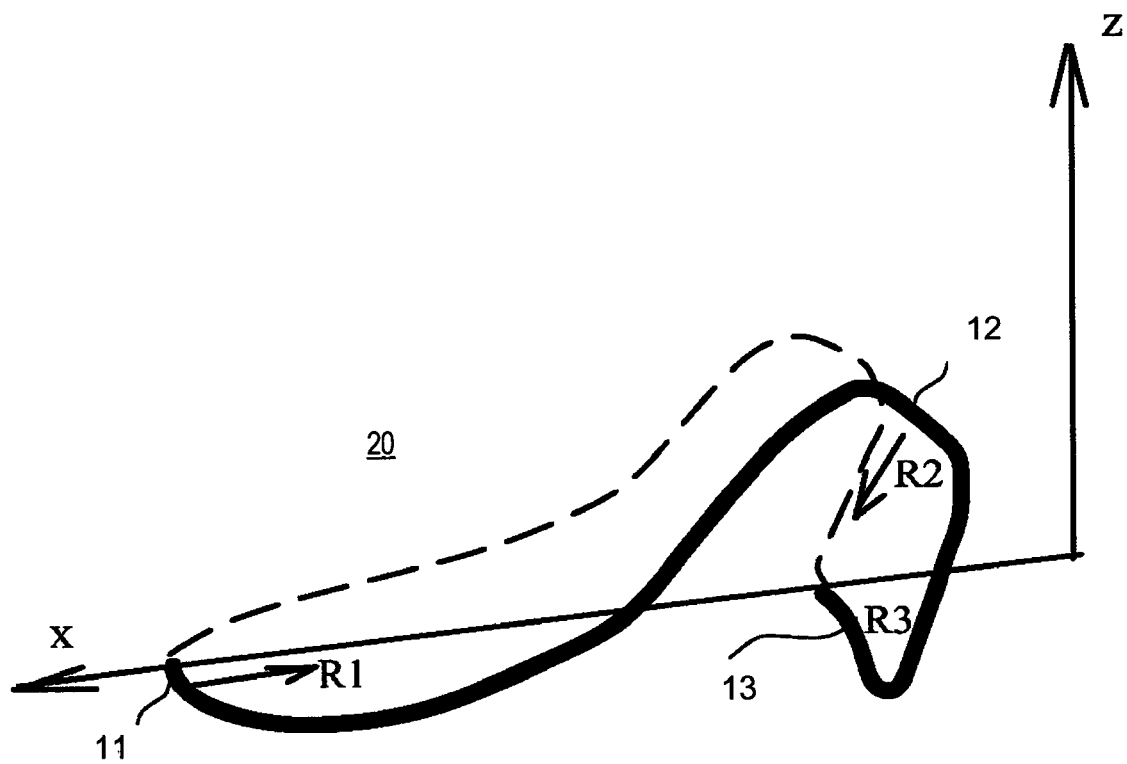
FIG. 3 illustrates a second embodiment of a rigid/semi rigid headband for a headlamp which allows deformation within three distinctive planes xz, xy and yz.
Figure 3:
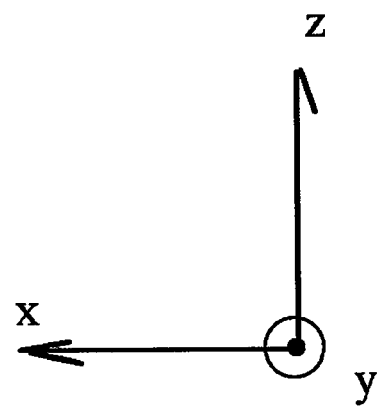

FIG. 3 illustrates a second embodiment of a rigid/semi-rigid headband 20 of a headlamp having a "rear" section which goes down before going through the median sagittal plane. More specifically, the headband comprises a front section 11 which is rigid/semi-rigid, allowing fixing of a lamp via a pivot connection, and which is located approximately in a horizontal plane (x, y) corresponding to a transverse plane with respect to the lamp holder. As before, in a first approximation, the radius of curvature R1 of the curve 11 is represented, which lies in the (x, y) plane.

Figure 5:
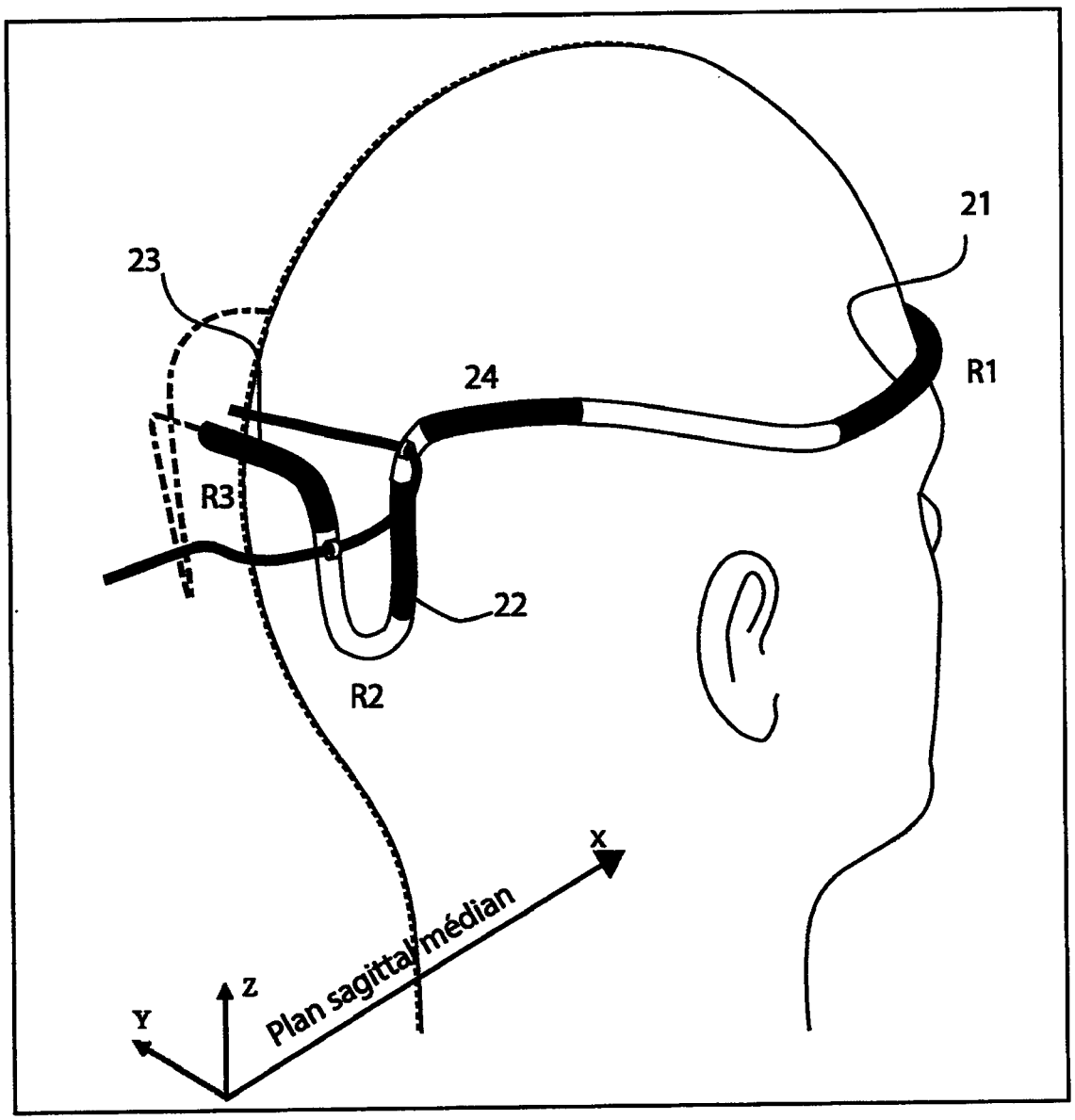
FIG. 5 illustrates the positioning of the headband of the third embodiment on the user's head.

Behind the front section—towards the right part in FIG. 5—one sees that the headband 20 then follows a curve 12 which is approximately in a vertical plane (x, z) which is parallel to the sagittal plane of the user and, again, the approximation of the radius of curvature R2 is shown.

Backward, the headband 20 follows a curve 13 which approximately fits in a plane (y, z) corresponding to the frontal plane with respect to the lamp user and the approximation of a radius of "curvature" equal to R3 . . . .

As before, the median sagittal plane serves as a plane of symmetry and the dotted part corresponds to the part of the headband situated "behind" the median sagittal plane.

It can be seen that the rear section of the second embodiment of the headband 20 "goes down" now before meeting the median sagittal plane, contrary to the diagram of the first embodiment illustrated in FIG. 1

However, as before, it can be seen that the headband 20 therefore comprises:

a rigid/semi-rigid front section 11 for fixing a lamp 101 and providing a certain deformability along a first plane (x, y) which is a transverse plane;

a rigid/semi-rigid intermediate section 12 allowing a certain deformability along a second plane (x, z) which is a sagittal plane;

A rigid/semi-rigid rear section 13 providing certain deformability along a third plane (y, z) which is a frontal plane.

By means of this advantageous arrangement, one achieves a three-dimensional shape which is deformable, within any one of the above plans, while preserving a constant length for the headband 20.

In a particular embodiment, the headband 20 comprises an alternation of rigid/semi-rigid elements as will now be described more specifically hereinafter, with FIGS. 4-22.

Figure 4:
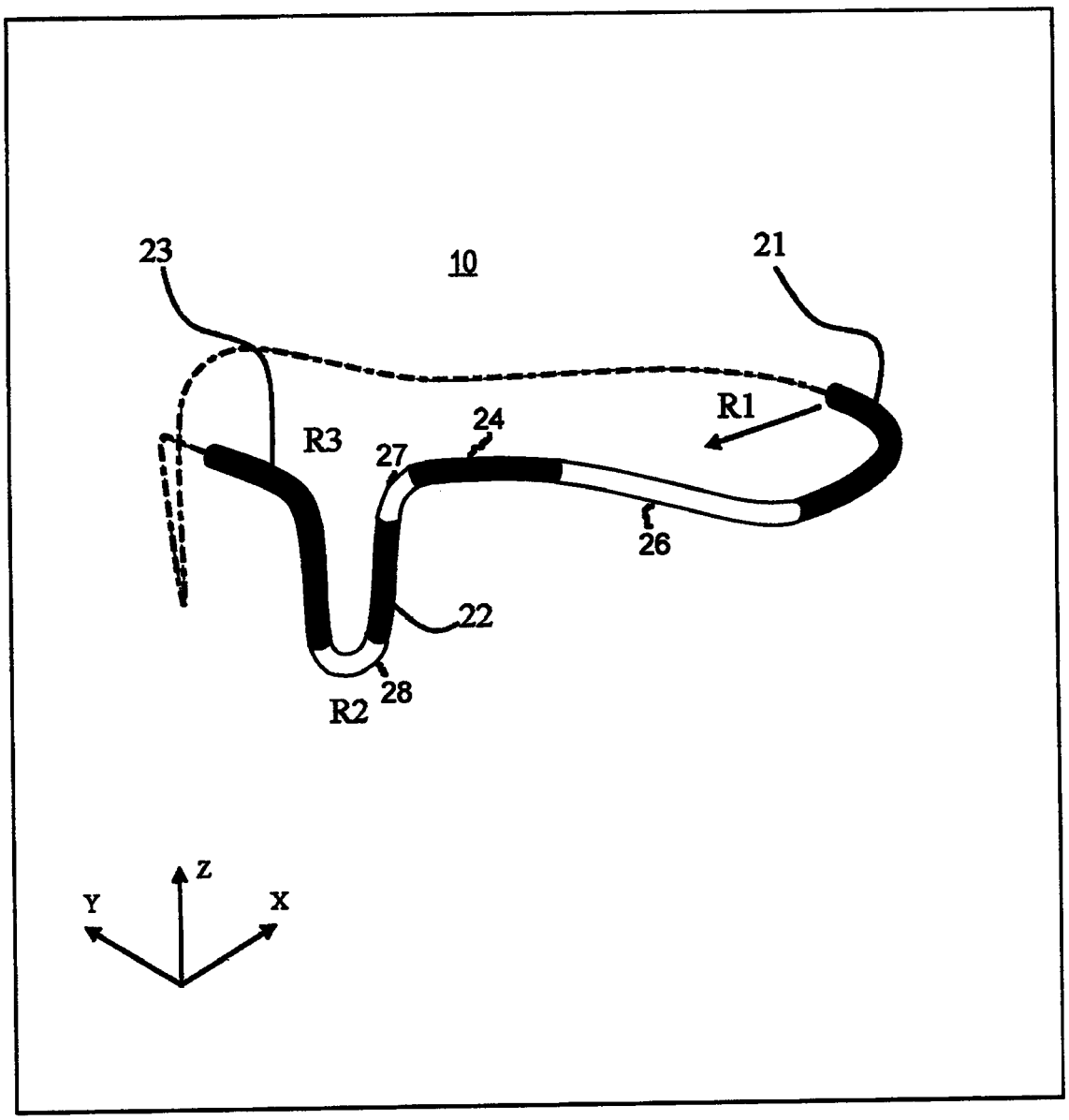
FIG. 4 illustrates a third embodiment of a headband comprising one front section and three semi rigid side sections allowing deformation within three planes xz, xy and yz.

In this respect, FIG. 4 illustrates a third embodiment substantially similar to the headband 10 of FIG. 1, but which more specifically comprises an alternation of rigid and semi-rigid (deformable) elements. The rigid elements are illustrated in the clear in the figure while the semi-rigid (deformable) elements are shown in dark. As it can be seen, the headband 10 of FIG. 4 comprises a right branch with a deformable semi-rigid front section 21 and then, from right to left:

A rigid lateral section 26 (clear),
A semi-rigid lateral section 24 (dark),
A rigid lateral section 27 (clear),
A semi-rigid lateral section 22 (dark),
A rigid lateral section 28 (clear),
A semi-rigid rear section 23 (dark).

As it can be seen, the front section 21, the lateral sections 24 and 22 and the rear section 23 which are all semi-rigid, allow the deformation of the headband of constant length in the three (x, y), (x, Z) and (y, z) planes. Thus causing the variability of the radii of curvatures R1, R2 and R3 enabling the fastening of the headband 10 to a head of any shape and size.

FIG. 5 illustrates the positioning of the band according to the third embodiment on the head of a user.

Figure 6:
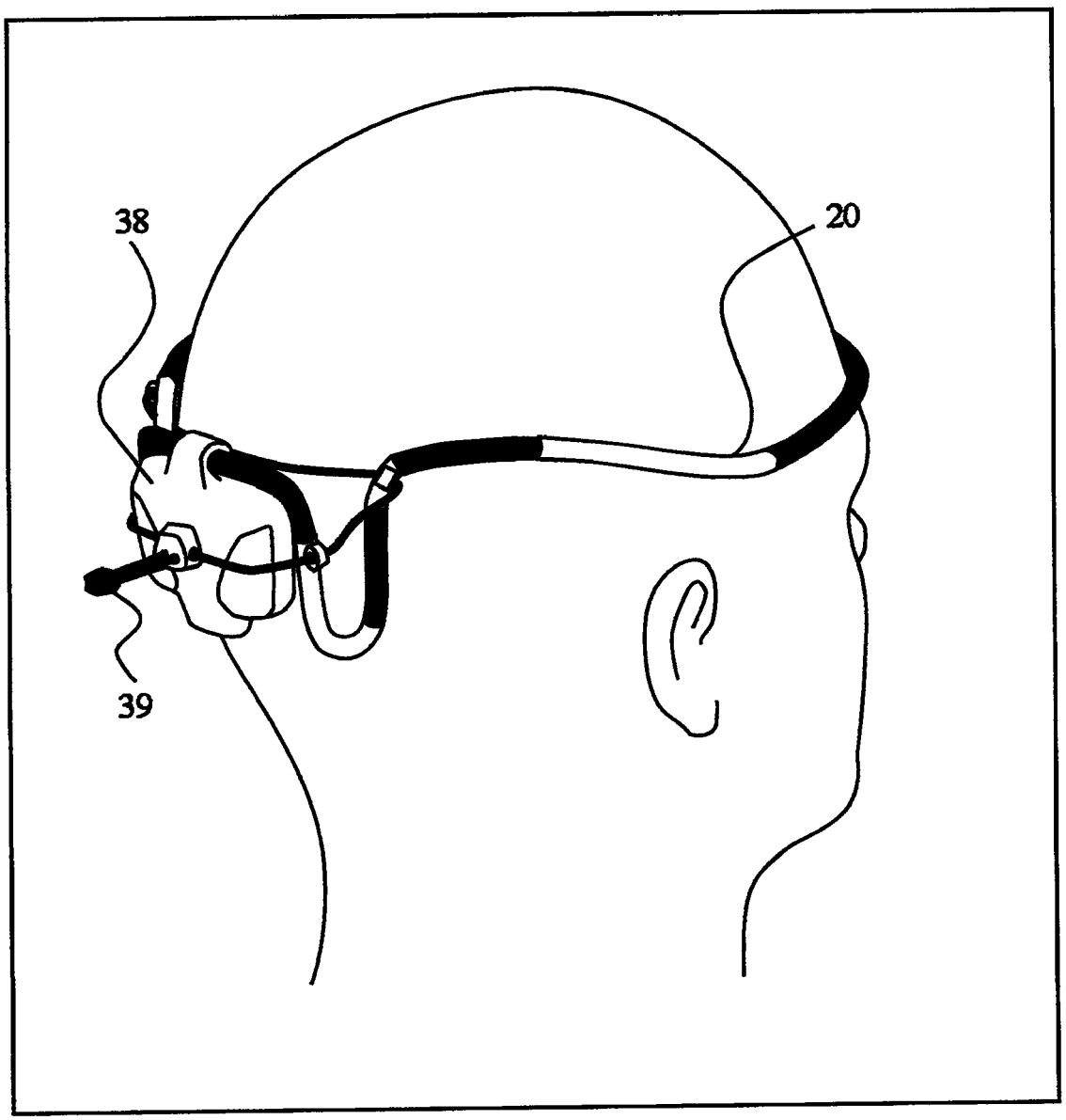
FIG. 6 illustrates a perspective rear view of a rigid/semi rigid headband according to the third embodiment.

FIG. 6 illustrates a rear perspective view of an embodiment of a rigid/semi-rigid headband according to the third embodiment, in which it can be seen that the rear section of the band—which "rises"—allows the fixing of a battery pack 38 as well as a fastening device 39 for the tightening elastic link. In a particular embodiment, the battery packed is housed in a rear housing rotatable by means of a pivot connection (not shown).

Figure 7:
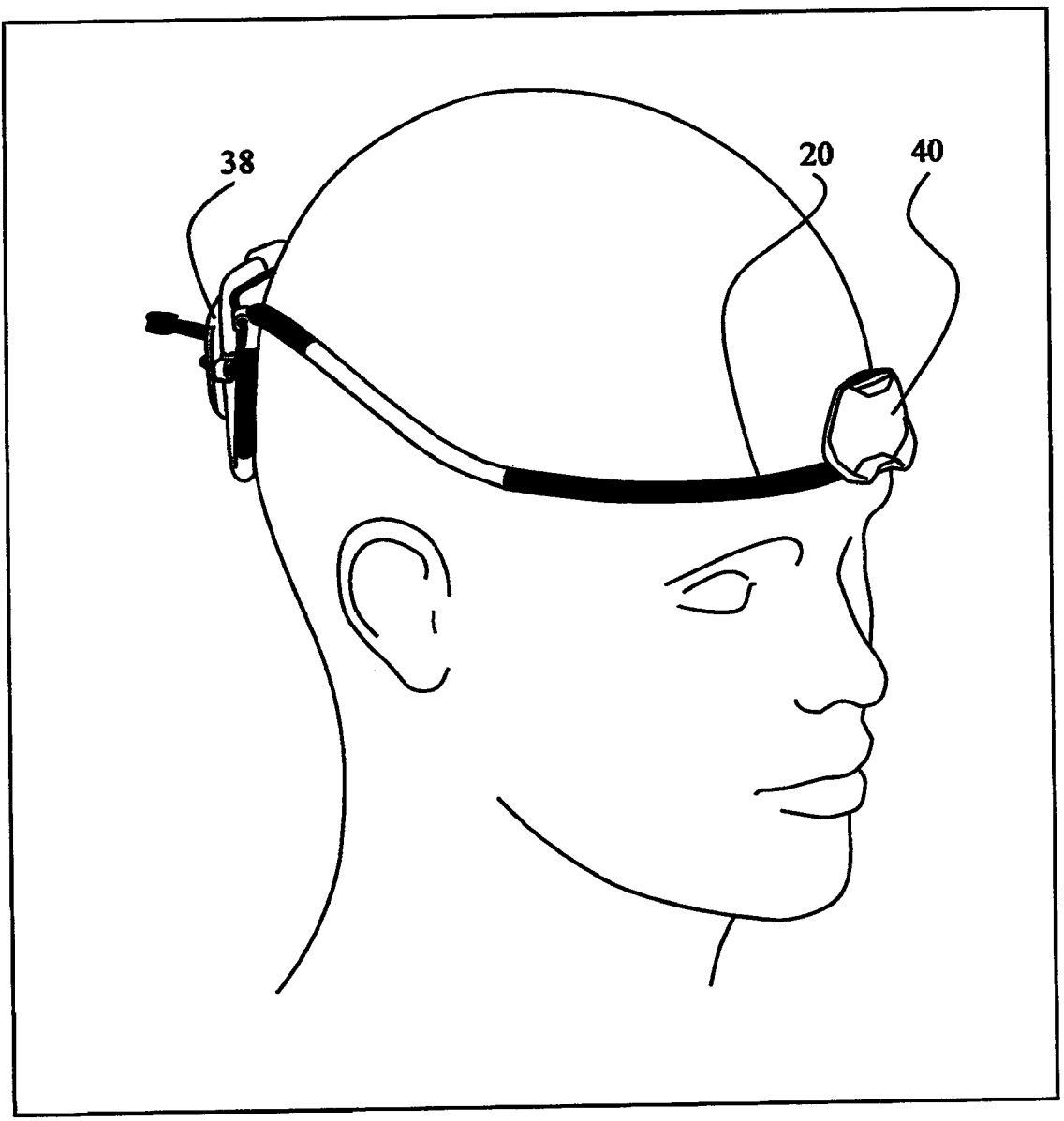
FIG. 7 illustrates a perspective front view of the headband of FIG. 6.

FIG. 7 illustrates a front perspective of the headband of FIG. 6 in which the lamp 40 and the battery are distinctly seen in the rear position.

Figure 8:
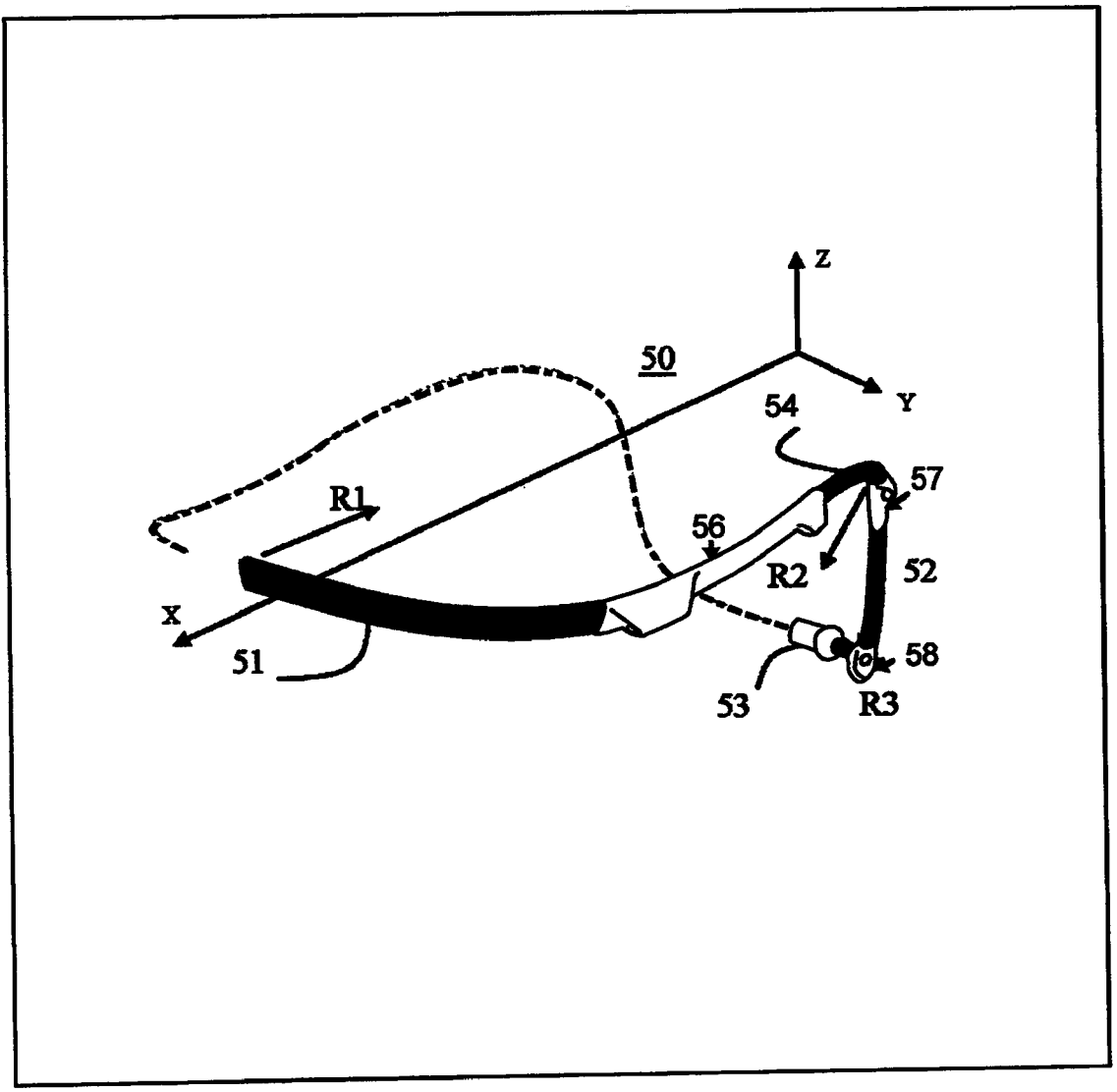
FIG. 8 illustrates a fourth embodiment of a headband which also comprises a front section and three semi rigid side sections of a headlamp which allows deformation within three planes xz, xy and yz.

FIG. 8 illustrates a fourth embodiment of a headband 50 also comprising, as for the headband of FIG. 4, an alternation of deformable semi-rigid elements 51, 54, 52, 53 (dark), and rigid elements 56, 57, 58 (clear), which allow the deformation of the headband with a constant length in the three planes (X, y), (x, z) and (y, z), as well and the variability of the angles of curvatures R1, R2 and R3, respectively. As before, FIG. 8 shows a left branch of the headband comprising a semi-rigid front section 51 and three semi-rigid lateral sections 54, 52 and 53. The right branch is not shown in FIG. 8 for the sake of simplicity, But can be constructed by symmetry with respect to the plane (xz).

Figure 9:
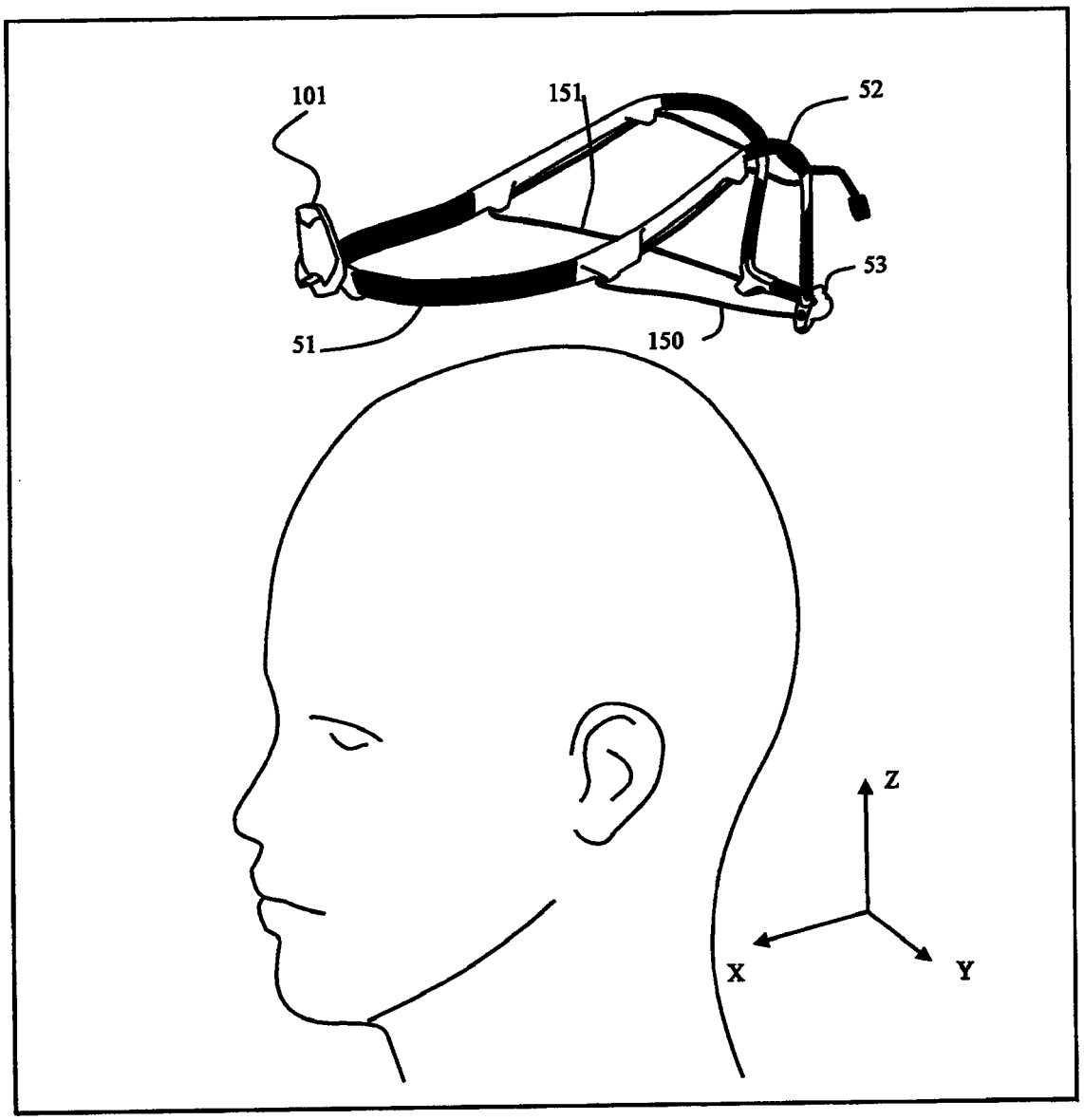
FIG. 9 shows how to position the fourth embodiment on the user's head.

FIG. 9 shows the positioning of the fourth embodiment on the head of a user. It can also be seen in FIG. 9 that the headband 50 comprises rigid elements (in clear) being configured for enabling the fastening and the passage of an elastic kink, respectively 151 and 150, to ensure tightening making it possible to constrain the deformation of the rigid/semi-Rigid band in the three planes, reducing the radii of curvatures R1-R3.

Figure 10:
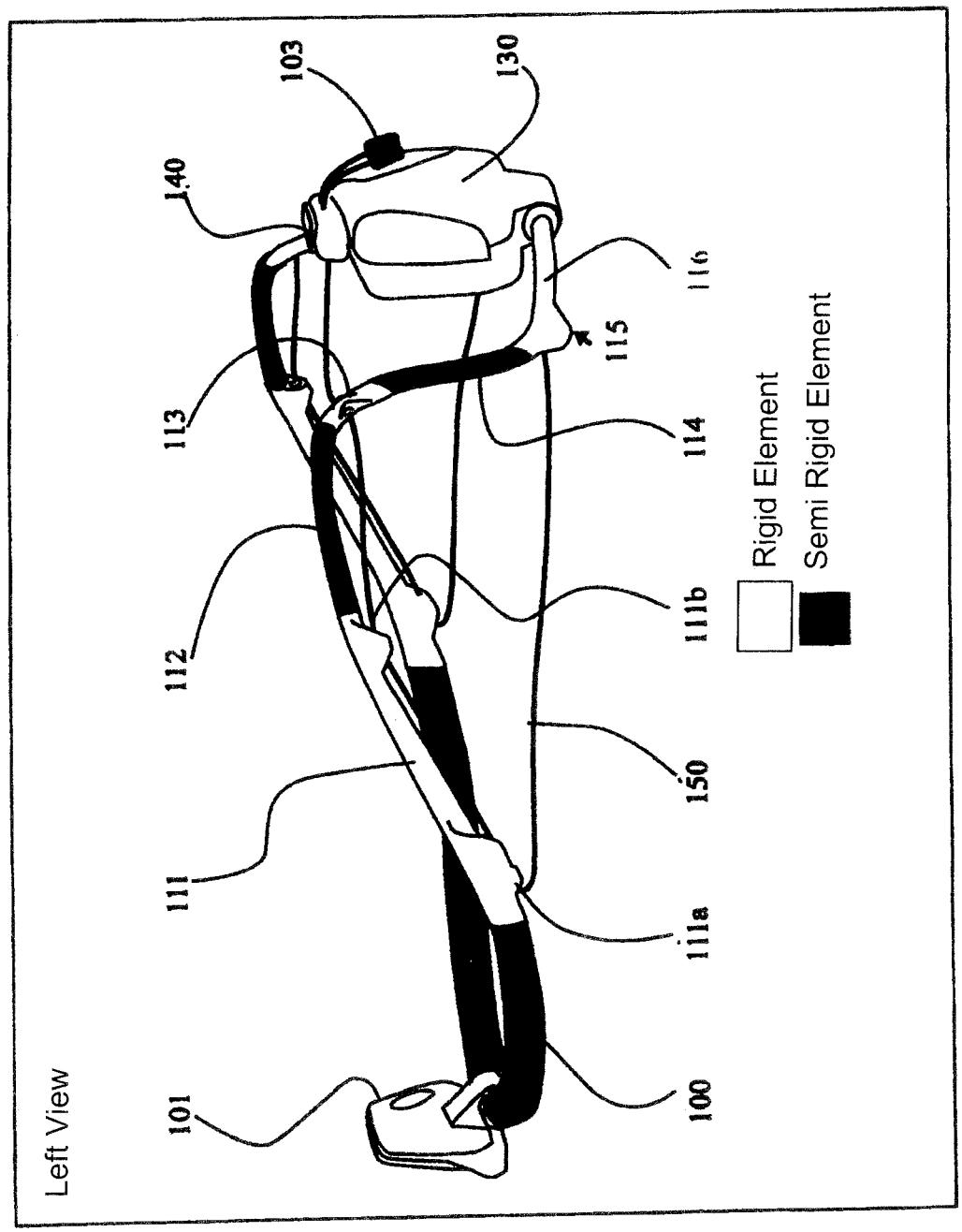
FIG. 10 shows a left view of a rigid/semi rigid headband according to the fourth embodiment.
Figure 11:
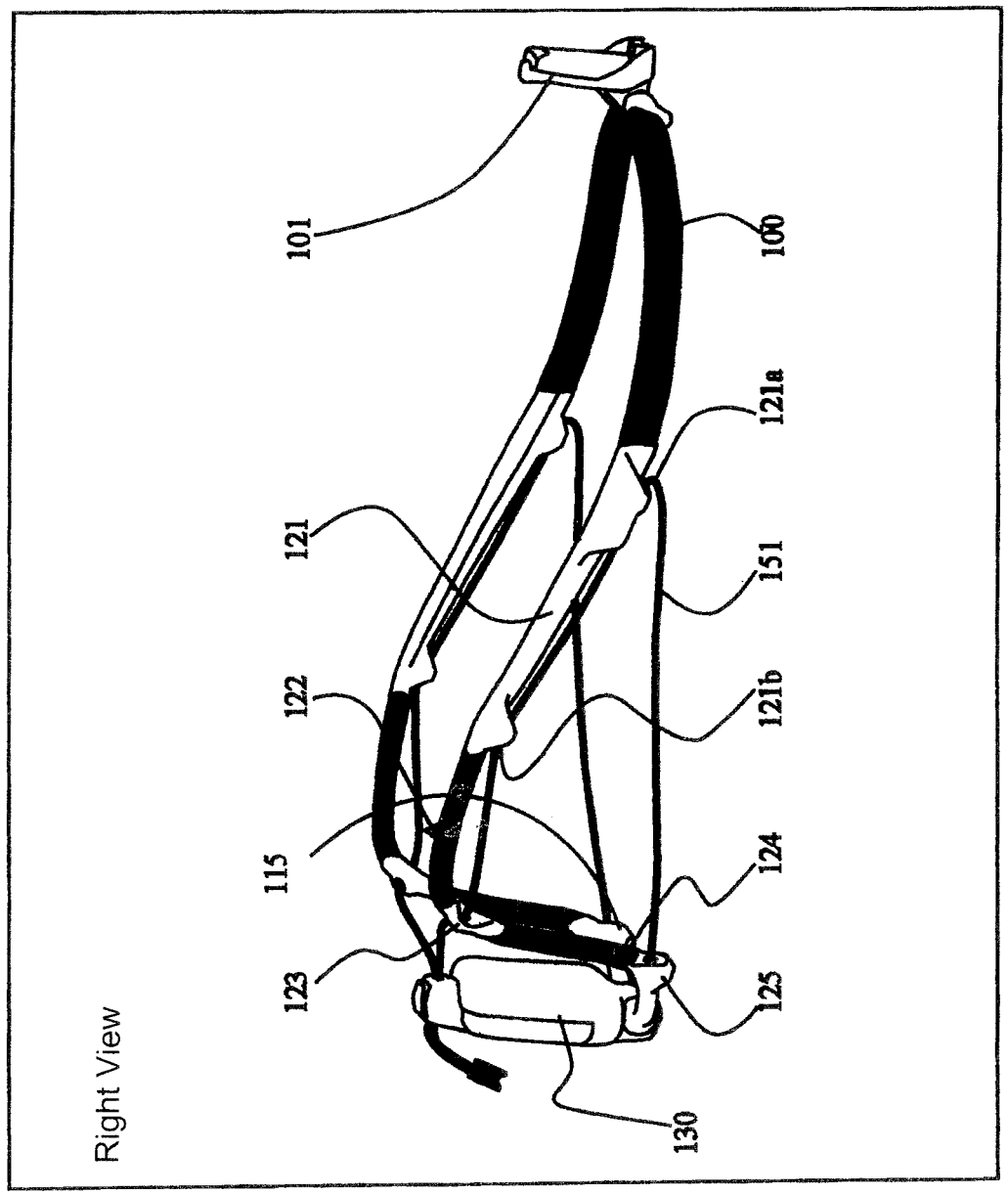
FIG. 11 illustrates the right view of the headband of FIG. 10.

FIGS. 10 and 11 illustrate the detail of a concrete embodiment of a rigid/semi-rigid band according to the fourth embodiment. The headband comprises an alternation of rigid elements, shown in clear in FIGS. 7 and 8, and of more flexible elements which are shown in dark.

Figure 22:
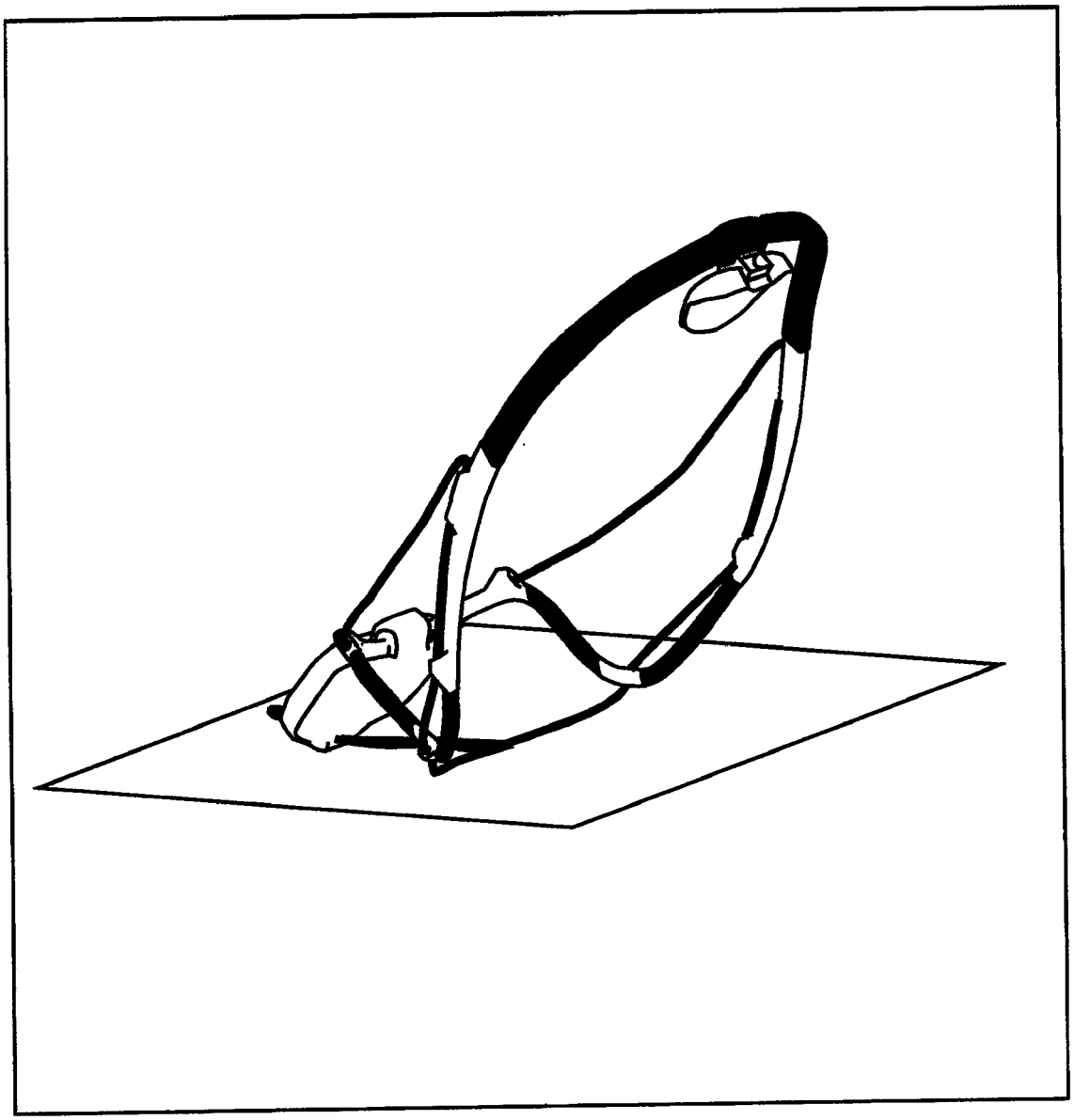
FIG. 22 illustrates the use of the new headband so as to embody a table lamp which can be placed on a table or any other supporting surface.

In a particular embodiment, the elements may be made of thermoplastic polyurethane (TPU) or of polyamide, polyester, PVC with grades chosen to allow the construction of a rigid/semi-rigid structure with a stable structure (allowing even the positioning of the headband on a table as shown in FIG. 22) while being sufficiently deformable by means of an elastic link 150. In practice, the more rigid elements will have a grade in the range [73SHD] (Semi-rigid) shall have a grade within the range of [70 Sh A].

Referring to FIG. 10, which more specifically shows a left view of the headband, the latter comprises a semi-rigid front section 100 on which will be fixed a rigid part called "platinum" serving as a support, via a pivot connection, for a lamp 101 comprising one or more LEDs associated with its electronic circuit. The front section can be extruded. Preferably, the lamp 101 comprises a plurality of medium power LEDs, and their associated optics. As a result, the lamp will take a relatively flat shape, with a large heat dissipation surface, which will enable the LEDs to be placed directly on a printed circuit acting as a radiator. This will result in a particularly compact lamp 101.

The headband further comprises a rigid (clear) rear section 116 forming a rear part of the headband. Alternatively, element 116 may become semi-rigid to fit on the xy plane.

Headband 20 comprises, on its left branch, a first rigid element 111 (of greater rigidity than the semi-rigid element 100) having a first lower end fixed to a first end of the front section 100, and a second upper end attached to a second semi-rigid element 112 (dark, therefore more flexible). The rigid element 111 comprises at its two lower and upper ends, respectively, two traversing holes 111a and 111b which are configured for receiving a first tightening elastic link 150.

The second semi-rigid element 112 has a first end fixed to the second end of first element 111 and a second end fixed to a first end of a third rigid element 113 serving as a point of passage for the elastic link 150 coming from the second element 111b belonging to the left branch.

The headband then comprises a fourth flexible (semi-rigid) element 114 having a first upper end fixed to a second end of the third element 113 and a second end fixed to a fifth rigid element 115 enabling the fastening of the first elastic link 150 coming from the traversing hole 111a.

The left branch of the headband is finally fastened to a first end of the rigid or semi-rigid element 116 forming the rear part of the rigid/semi-rigid headband, via a second end of the rigid element 115.

It will be noted that, according to the embodiment being considered, the rear section 116 may be rigid or semi-rigid so that the elements 115 and 116 can or can note formed from a same manufacturing process. When the rear part 116 is semi-rigid (represented in dark), then the fifth rigid element 115 will be distinct from the latter. On the contrary, if the rear part 116 is rigid, the elements 115 and 116 may be identical or resulting from the same manufacturing process.

FIG. 10 illustrates the detail of the left branch of the headband, which, as can be seen, is perfectly symmetrical with respect to the right branch. One can see in FIG. 11 that the right branch includes a sixth rigid member 121 having a first lower end attached to a second end of the front section 100 and a second upper end attached to a first end of a seventh flexible member (Semi-rigid) 122. The rigid element 121 has, at its two lower and upper ends, two passage holes 121a and 121b which are configured for receiving a second tightening elastic link 151, respectively.

The seventh flexible element 122 comprises a first end fixed to the element 121 and a second end fixed to a eighth rigid element 123 serving as a point of passage for the elastic link 151 coming from the elements 121b of the left branch.

The headband then comprises a ninth flexible (semi-rigid) element 124 having a first upper end fixed to a second end of the element 123 and a second lower end located at a first end of a tenth rigid element 125 and allowing the fastening of the second elastic link 151 coming from the passage hole 121a.

The right branch of the headband is finally attached to the rear (semi-rigid) element 116 which forms the rear of the rigid/semi-rigid band via a second end of the rigid element 125.

Figure 12A:
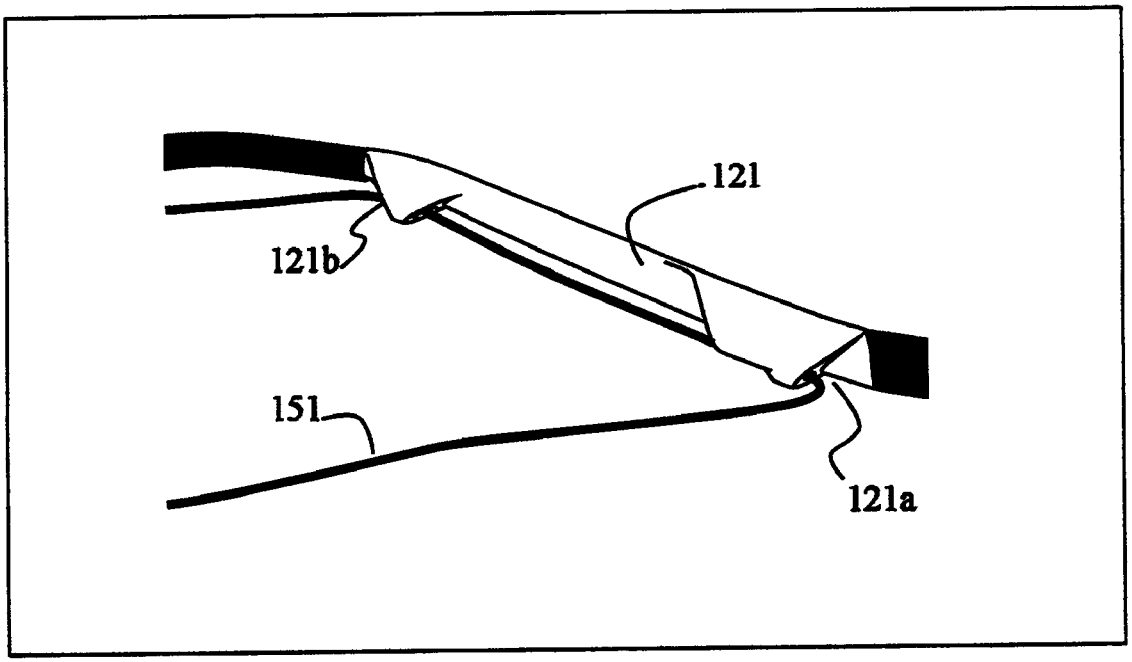

FIG. 12a illustrates the detail of rigid element 121 having, at its two ends 121a and 121b, the passage holes which are configured to receive the elastic link 151 allowing the strain on the radius of curvature R2 and, consequently, the deformation of the headband within the sagittal plane (x, z)

Figure 12B:
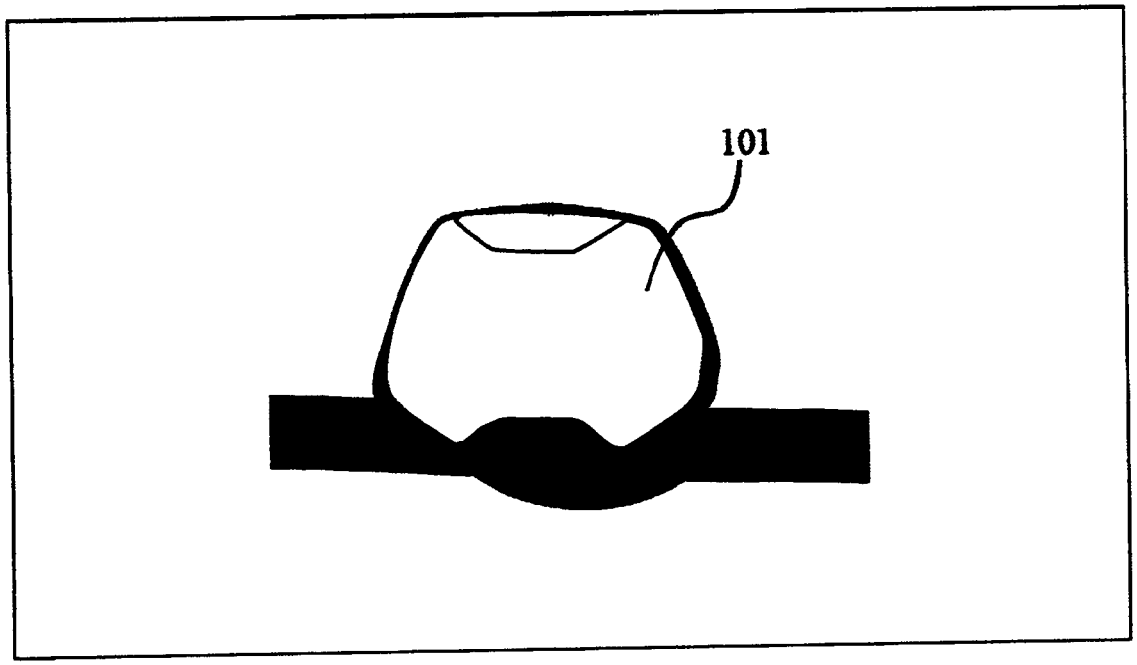
FIG. 12b illustrates an embodiment of a lamp 101 attached to the semi-rigid front part of the headband by means of a pivot having a large amplitude greater than 180 degrees on a rigid element at the front of the band.

FIG. 12b illustrates an embodiment of a lamp 101 attached to the semi-rigid front part of the headband by means of a pivot having a large amplitude greater than 180 degrees on a rigid element at the front of the band. This pivot function of wide amplitude makes it possible, as will be seen hereinafter, to allow a further adjustment of the headlamp when it is used as a "neck strap". More precisely, the pivot of the headlamp is advantageously configured to allow a rotation of approximately 90°, which allows a better adaptability to the morphology of the lamp holder and thus improves comfort. This rotation also makes it possible to considerably increase the balance of the lamp when it is placed on a table for example.

Figure 13:
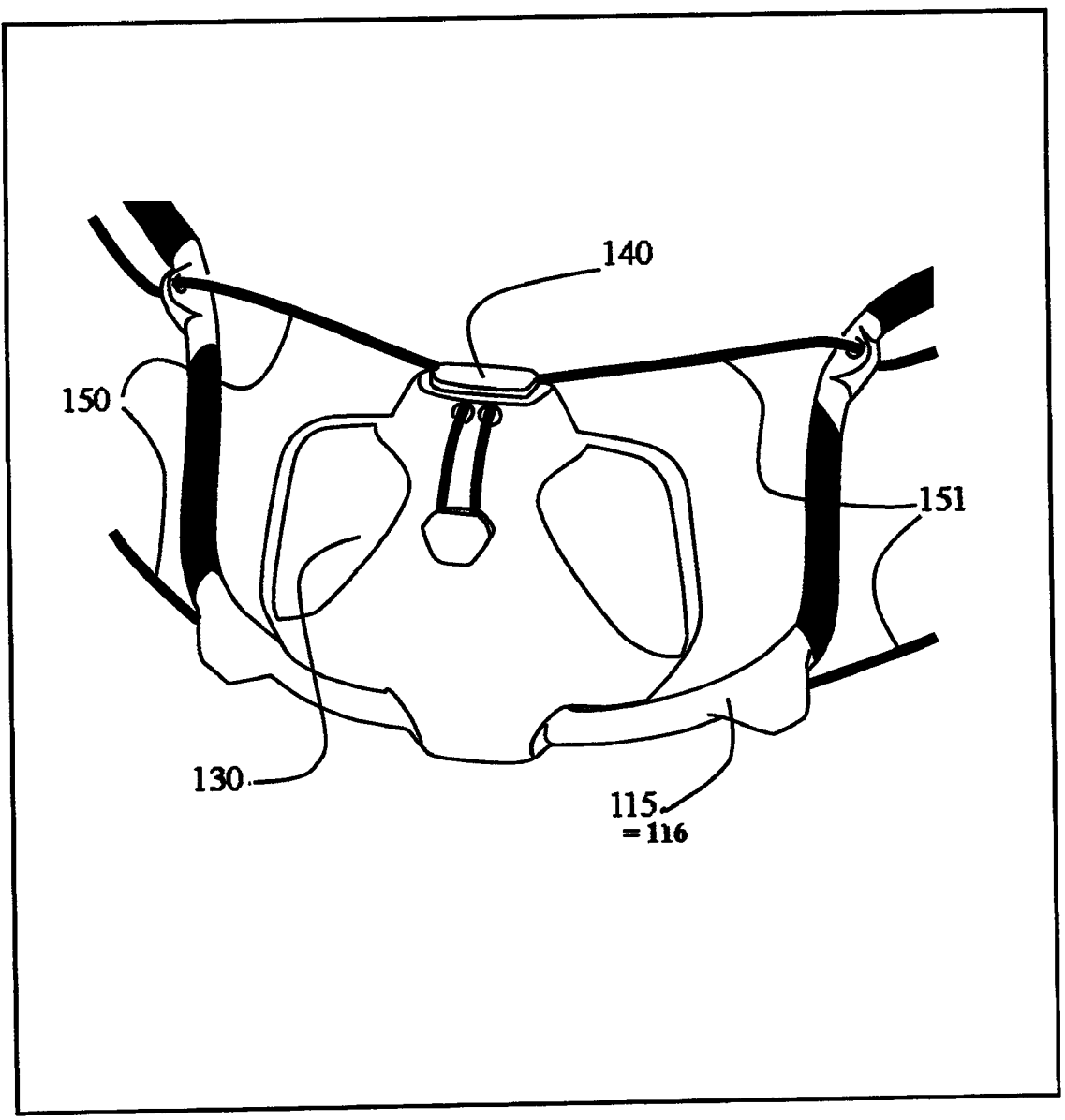
FIG. 13 illustrates the fourth embodiment, configured to receive a battery pack at the rear of the rigid/semi rigid headband.
Figure 14:
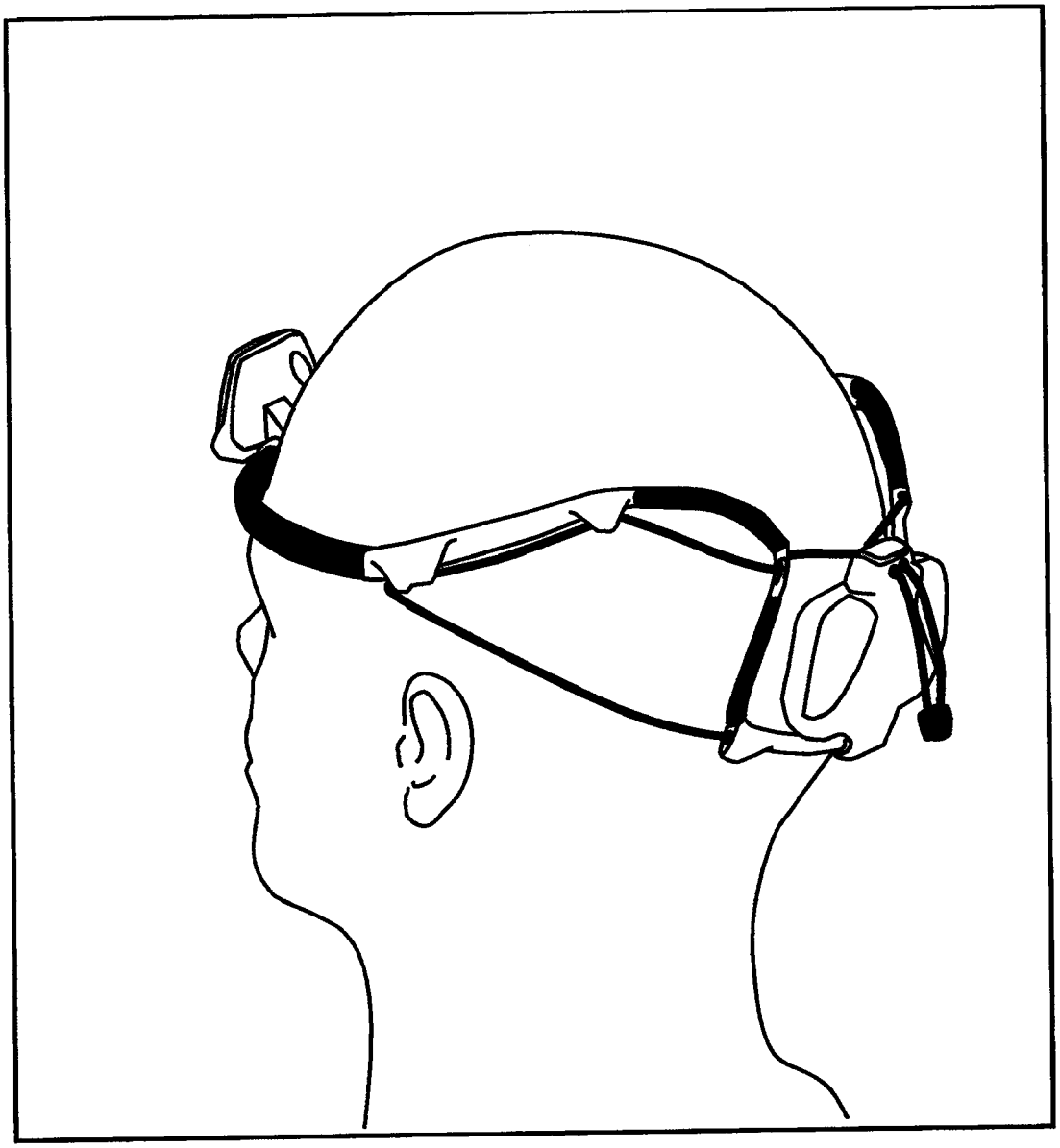
FIG. 14 is a rear perspective view, illustrating the positioning of the rigid/semi rigid headband of the fourth embodiment on a user's head of a small size.

In a particular embodiment, the headband illustrated in FIGS. 13 and 14 comprises, at the rear, a powering battery pack 130 for supplying current to the lamp 101. Preferably, the battery pack comprises, at the top, A passage hole for the elastic link 150 and 151 with a locking button 140. FIG. 13 illustrates a rear view of the headband clearly showing the battery pack 130, the passage hole for the elastic link 150 and 151 and the locking button 140. In the diagram of FIG. 13, it can be seen that the rear part 116 is made of a rigid material such as the element 116, so that the two elements 115 and 116 are made from the same manufacturing process. However, this is only a particular embodiment because, once again, the element 116 may optionally be made of a semi-rigid material.

As can be seen, the headband forms an overall structure consisting of an alternation of rigid and semi-rigid elements, which is relatively stable since it can be placed on a table in the manner of any object. In this way, the headlamp can be used as a table lamp. Furthermore, the flexibility of the flexible elements allows deformability of the headband in the space which is achieved by the tightening of the elastic link 150 and 151 and their blocking at the locking button 140 located on the top of the battery which, can pivot backwards as required.

One can thus achieve a new headband which shows a new look, a quite new and original appearance that is likely to please new categories of consumers, potentially repulsed by the "tool" aspect of traditional headlamps.

Moreover, this new type of rigid/semi-rigid headband offers multiple new functionalities, as will be seen at present.

In a particular embodiment, the left and/or right branches of the headband are hollow and their constant length makes it possible to integrate therein a plurality of electrical conductors and/or optical fibers. This eliminates in a particularly elegant and functional manner, of the electrical wires known in conventional headlamps with a elastic headband having variable length. The space will be sufficient to integrate, within the rigid/flexible elements, power conductors and control conductors which will thus be particularly well protected therein.

In a particular embodiment, the headband comprises a rear light allowing the lamp holder to be signaled. This rear signaling can be generated by means of a secondary lamp attached to the battery pack 130 or, alternatively, by deviating part of the light produced by the lamp 101 thanks to one or optical fibers. Advantageously, light can thus be deviated from the front part of the headband to the rear part. Conversely, it is also possible to combine a light source in the rear case (red) with a set of optical fibers in order to deport a fraction of the light (red) generated by the rear case to the front or towards the side.

In a particular embodiment, the front part 100, or even the rigid branches 111 and 121, are equipped with switches for controlling the functionalities of the lamp, which certainly did not offer the conventional headlamps. Alternatively and/or cumulatively, one or more displays can be provided enabling an advantageous human-machine Interface (HMI) to be achieved.

In another particular embodiment, the left and right branches of the headband are designed to be luminous so as to allow effective lateral signaling of the lamp holder.

FIG. 14 is a rear perspective, illustrating the positioning on a head of small size of the rigid/semi-rigid headband according to the second embodiment.

Figure 15:
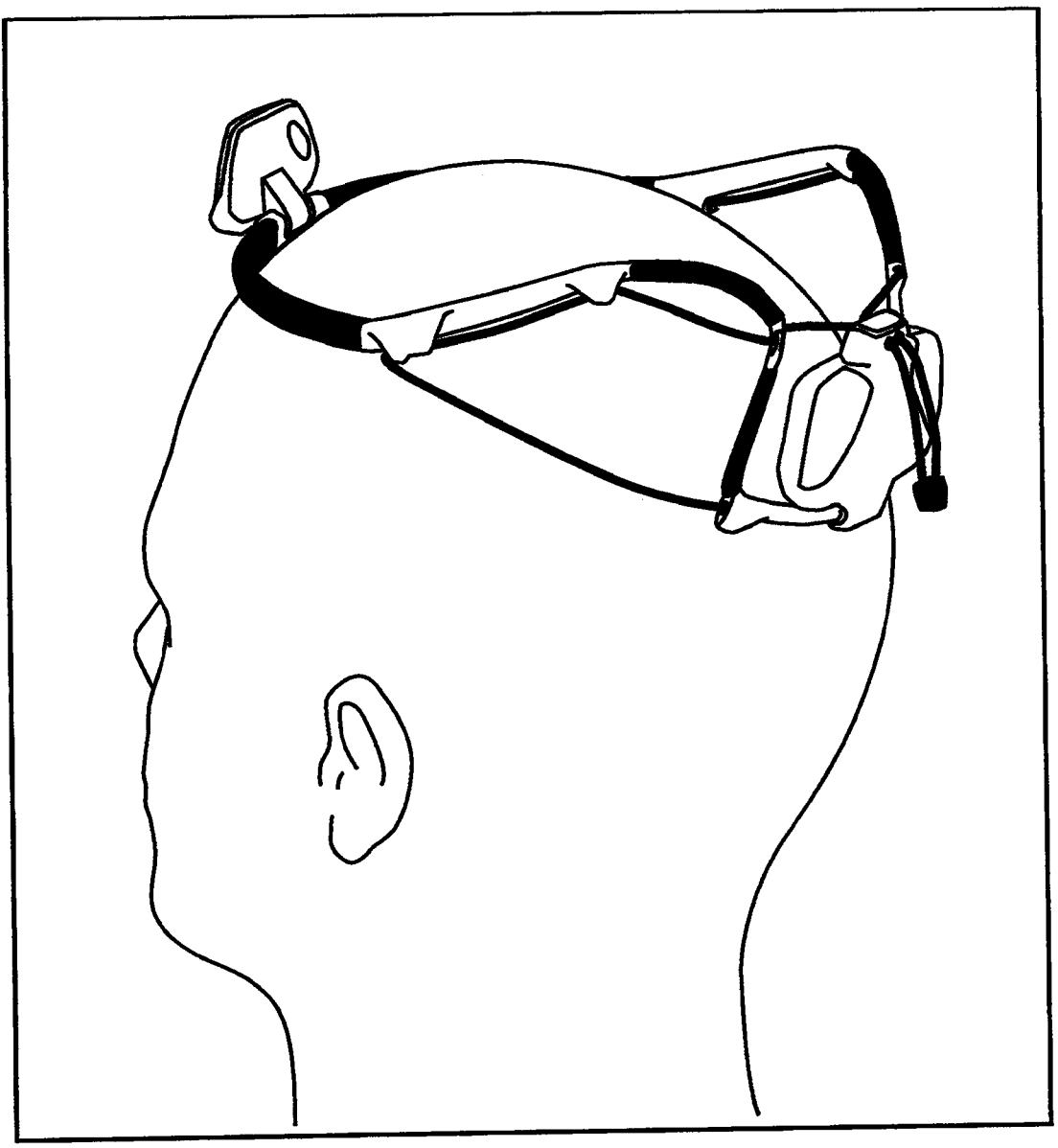
FIG. 15 shows the positioning of the same headband used in FIG. 4, with a similar tightening of the elastic link, on a user's head of a larger size.

FIG. 15 shows the positioning of the same headband as that used in FIG. 14, with the same tightening of the elastic link, over a head of greater size. It can be seen that the adjustment of the headband made in FIG. 14 does not allow positioning on a head of greater size. Nevertheless, it is sufficient to press the locking button 140 to release the elastic link 150-151 and then release the deformation of the headband so as to enable it to conform to the larger head shape of the user being considered.

Figure 16:
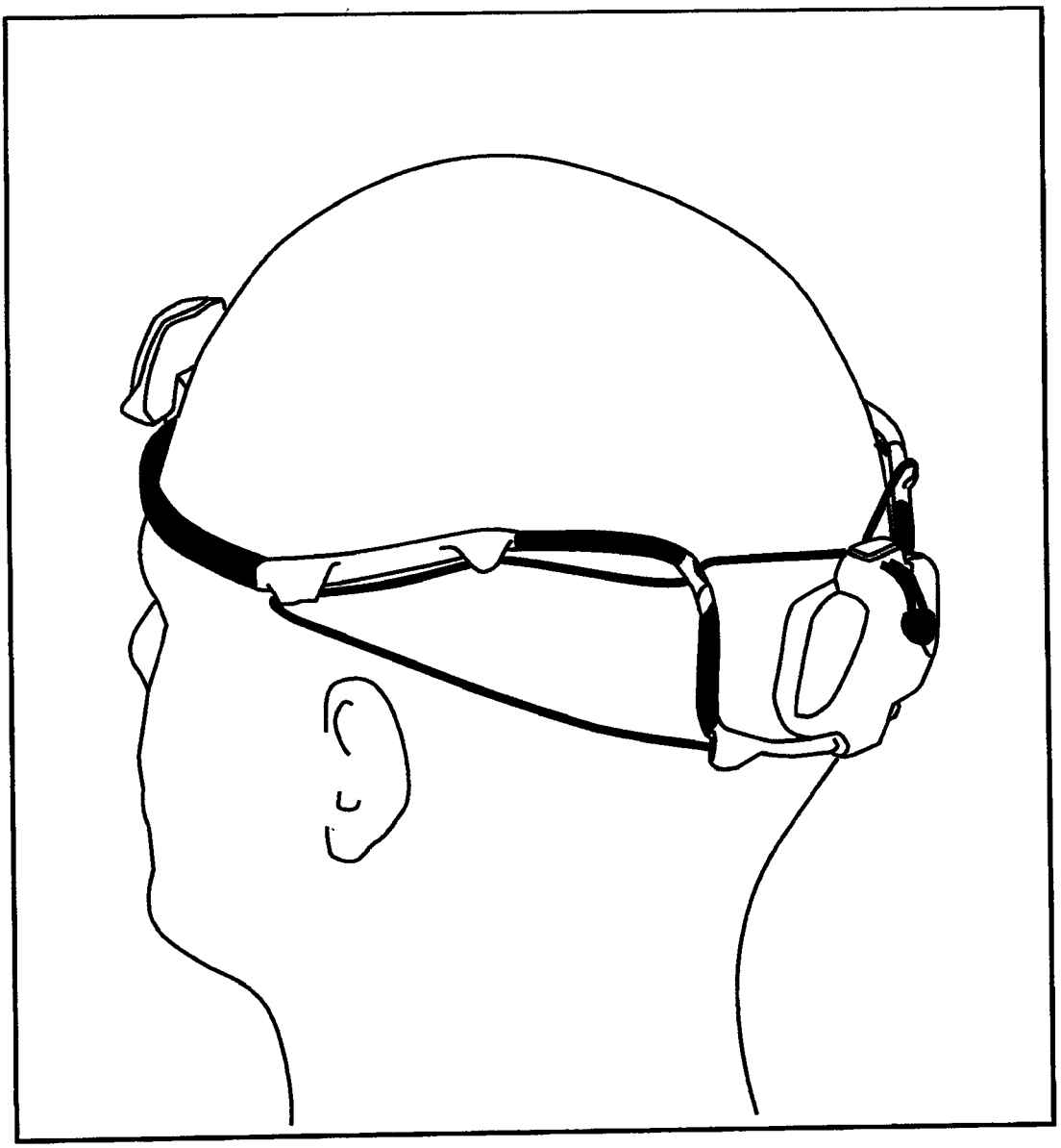
FIG. 16 illustrates the tightening and adjustment of the rigid/semi rigid headband on a user's head having a very large size.

This is seen with the diagram in FIG. 16 which shows that the rigid/semi-rigid headband is now perfectly adapted to the size of the new user head.

Figure 17:
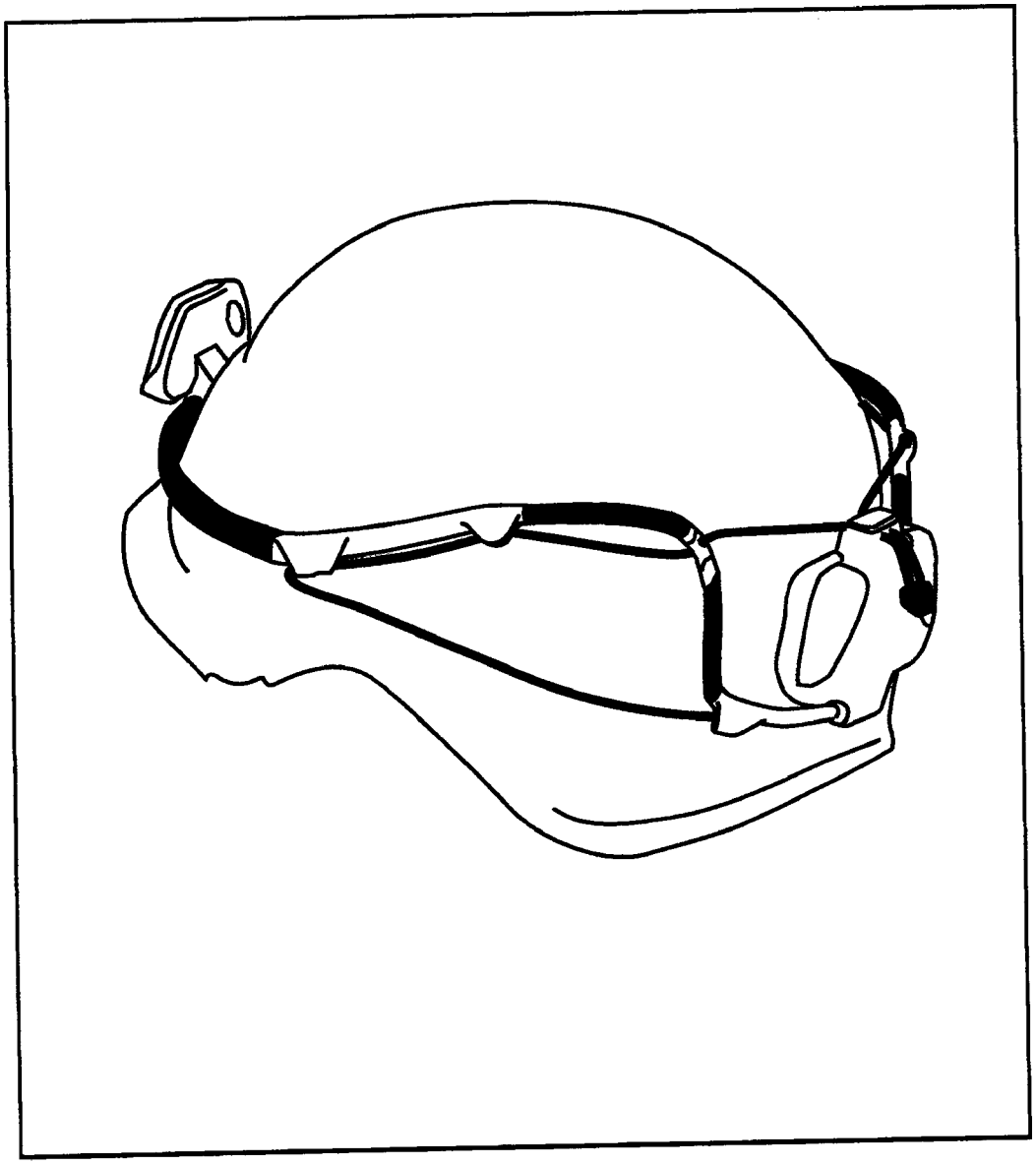
FIG. 17 illustrates the tightening and adjustment of the rigid/semi rigid headband on a safety helmet.

FIG. 17 illustrates the adjustment of the rigid/semi-rigid headband according to the second embodiment to the size of a safety helmet.

As can be seen with the figures which have just been described, the new headband shows an exceptional adjustment capacity since it allows variations of 19 centimeters of perimeters for the various user heads and even an adjustment on the helmet of FIG. 17. This is clearly a significant advantage of this new type of headband.

It has been evoked above the ability of the lamp 101 to rotate—as illustrated in FIG. 12b—about the rigid front part 100 by means of a pivot having a large amplitude. This results in new possibilities of use, particularly convenient, especially as a kind of "neck lace" or "neck strap", or when attached to a support, such as a tree branch.

This particular use of the headband will now be described in detail with reference to FIG. 20 which illustrates a headlamp comprising a lamp 210 provided with a light source which is fixed on a headband allowing the lamp to be held on a user's head. The headband comprises a rigid/semi-rigid front part 200 serving as a support for the lamp 210. Two pivots 201 and 202 respectively are arranged on the front part of the headband to allow a wide pivoting of at least 180 degrees.

Such variation in the pivoting of the lamp is generally unnecessary when the lamp is conventionally worn on the head of a user. Indeed, a pivot of 180 degrees of the lamp 210 would tend to make the lamp 210 "abut" against the front of the user.

Consequently, a headlamp is not conventionally equipped with the pivot provided with such an amplitude.

Figure 19A:
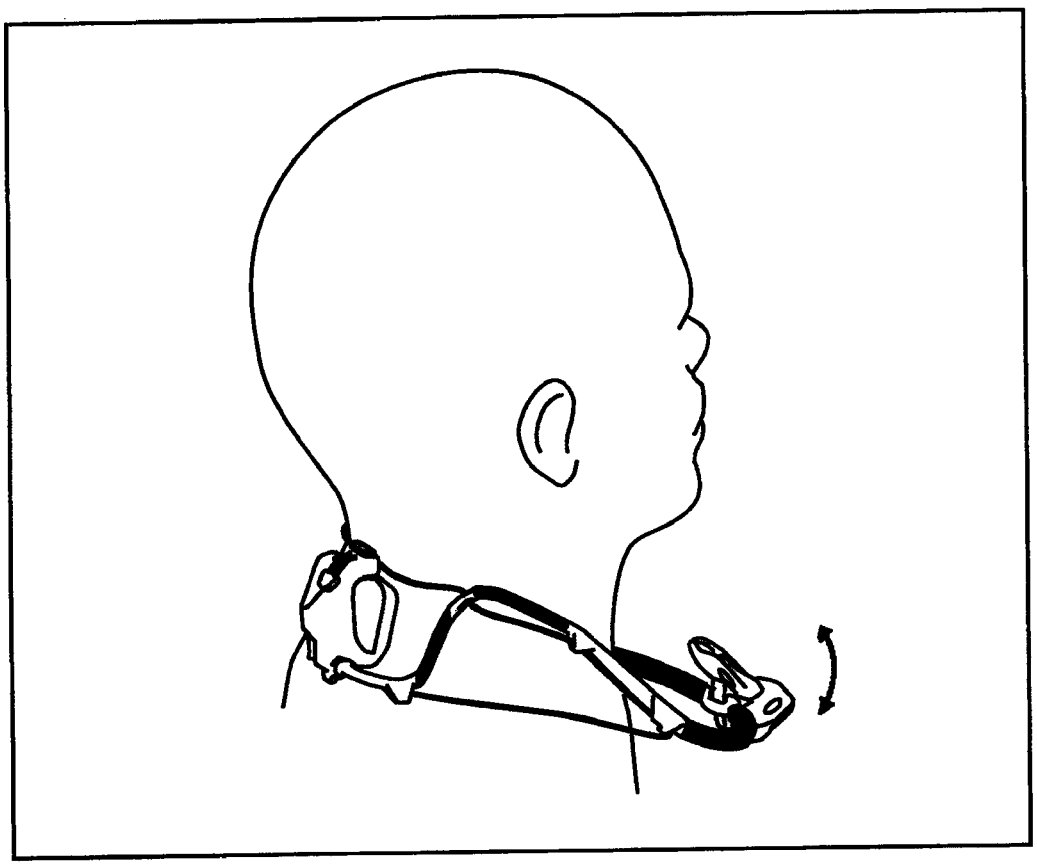
FIG. 19a illustrates a rear right perspective of a mannequin carrying, as a necklace, one embodiment of a headlamp according to the present invention, wherein the lamp is shown in two distinct pivoting positions.
Figure 19B:
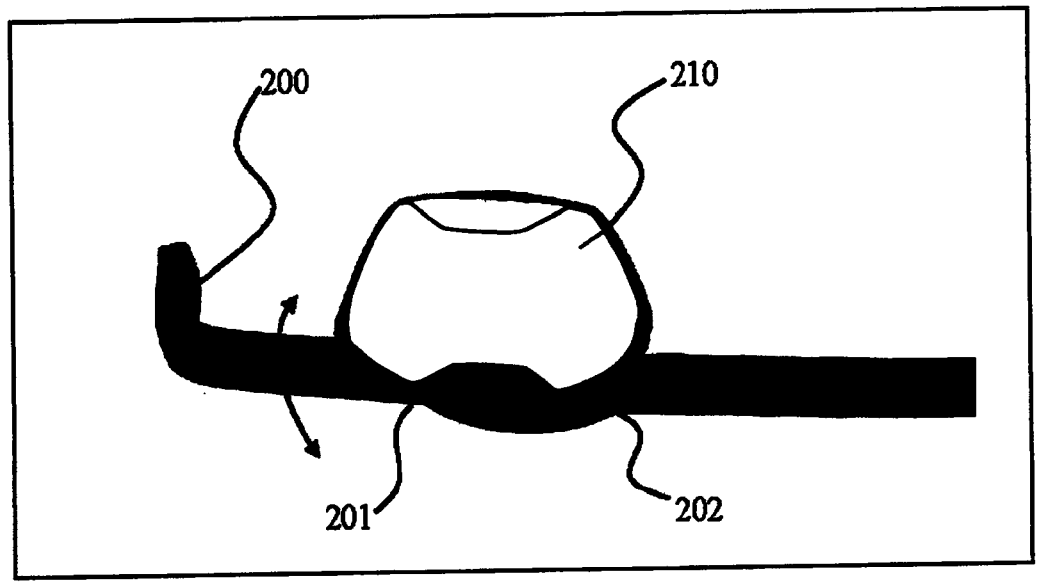
FIG. 19b illustrates one embodiment of a headlamp according to the present invention, based on a rigid/semi rigid headband and fitted with one pivot, wherein the pivot has at least 180 degrees.
Figure 20:
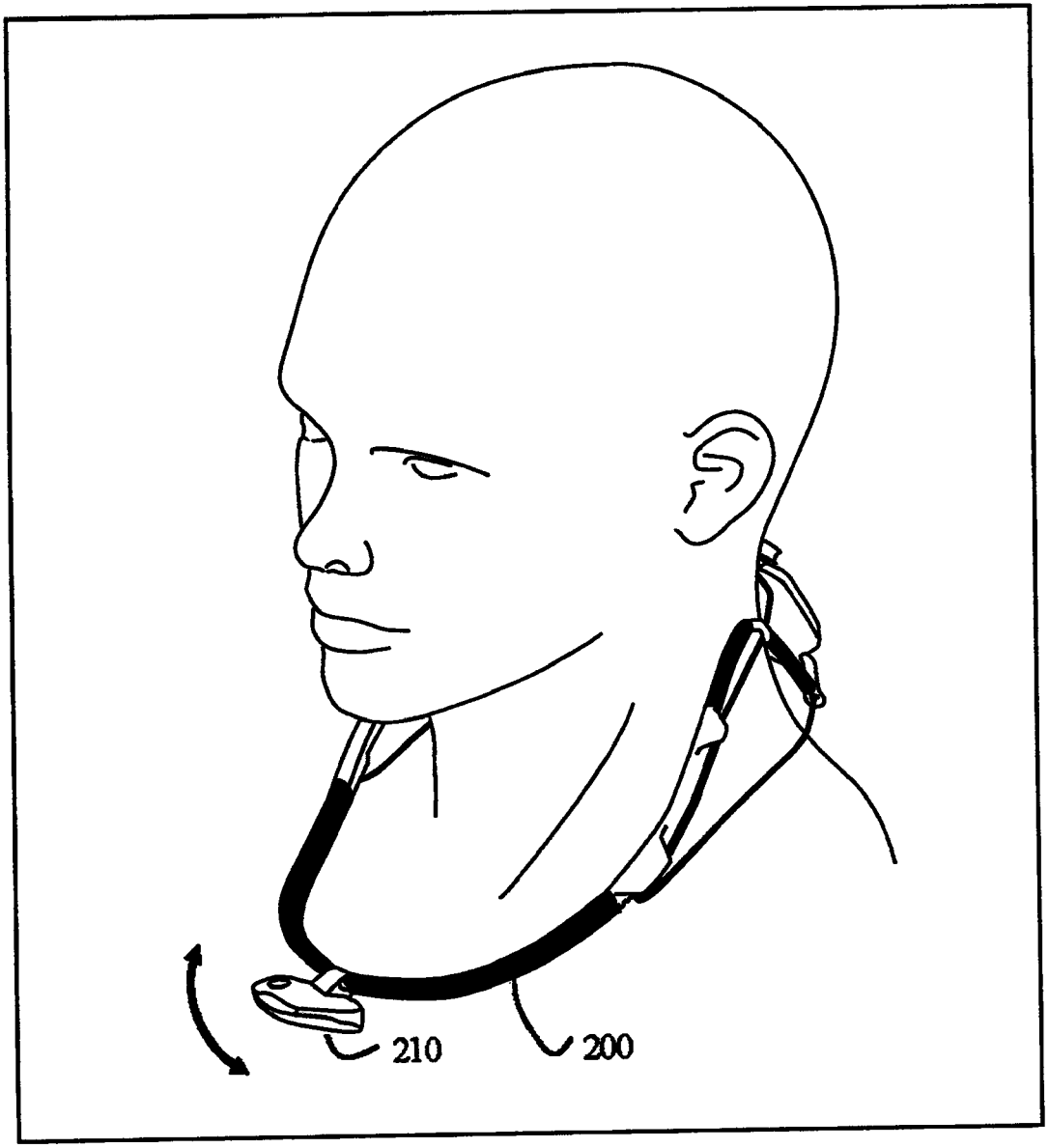
FIG. 20 illustrates one example of an embodiment of FIG. 17, used as a "necklace/neckstrap" or as a table lamp which can be placed on a supporting surface.

Surprisingly, such a pivot proves to be particularly useful and the lamp can then be advantageously worn as a "neckstrap" by a user as illustrated in FIG. 19a or 20.

In such a situation, one meets the combination of two particularly fruitful technical effects:

Firstly, a pivot having an amplitude of 180 degrees then makes it possible to adjust the light beam in a wide range of uses. Thus, the user can adjust the light beam so that it illuminates downwards or, on the contrary, illuminates it horizontally. The lamp thus becomes usable in this second configuration and even others since the same ease of adjustment becomes possible when the headlamp is hooked to a support;

Secondly, the pivot being fastened to a rigid/semi-rigid part of the holding headband, this results in a high stability of the lamp which can then be accurately adjusted with ease according to the needs of the user.

As can be seen, the combination of the two means of the invention, a pivot with a large amplitude (180 degrees) on a rigid/semi-rigid support, gives the headlamp new possibilities of use.

Figure 18:
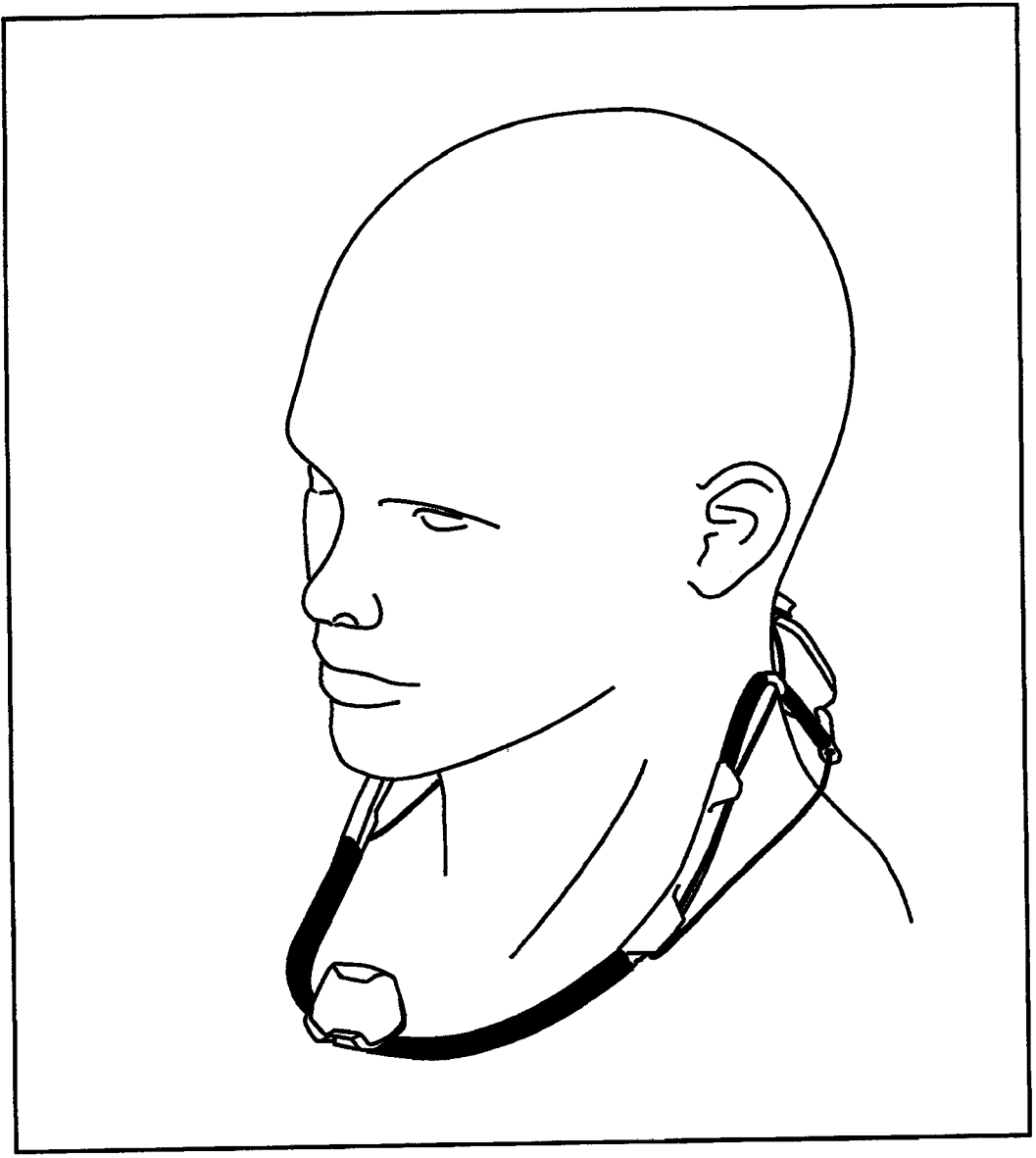
FIG. 18 illustrates a left view of a mannequin carrying, as a necklace or a neck strap, an embodiment of a headlamp according to the present invention.

FIG. 18 illustrates a right view of a mannequin which carries, around its neck, an embodiment of a headlamp in accordance with the present invention wherein the lamp is shown in two distinct pivot positions.

FIG. 19a illustrates a left-hand view of a mannequin carrying, around its neck, an embodiment of a headlamp in accordance with the present invention.

Figure 21:
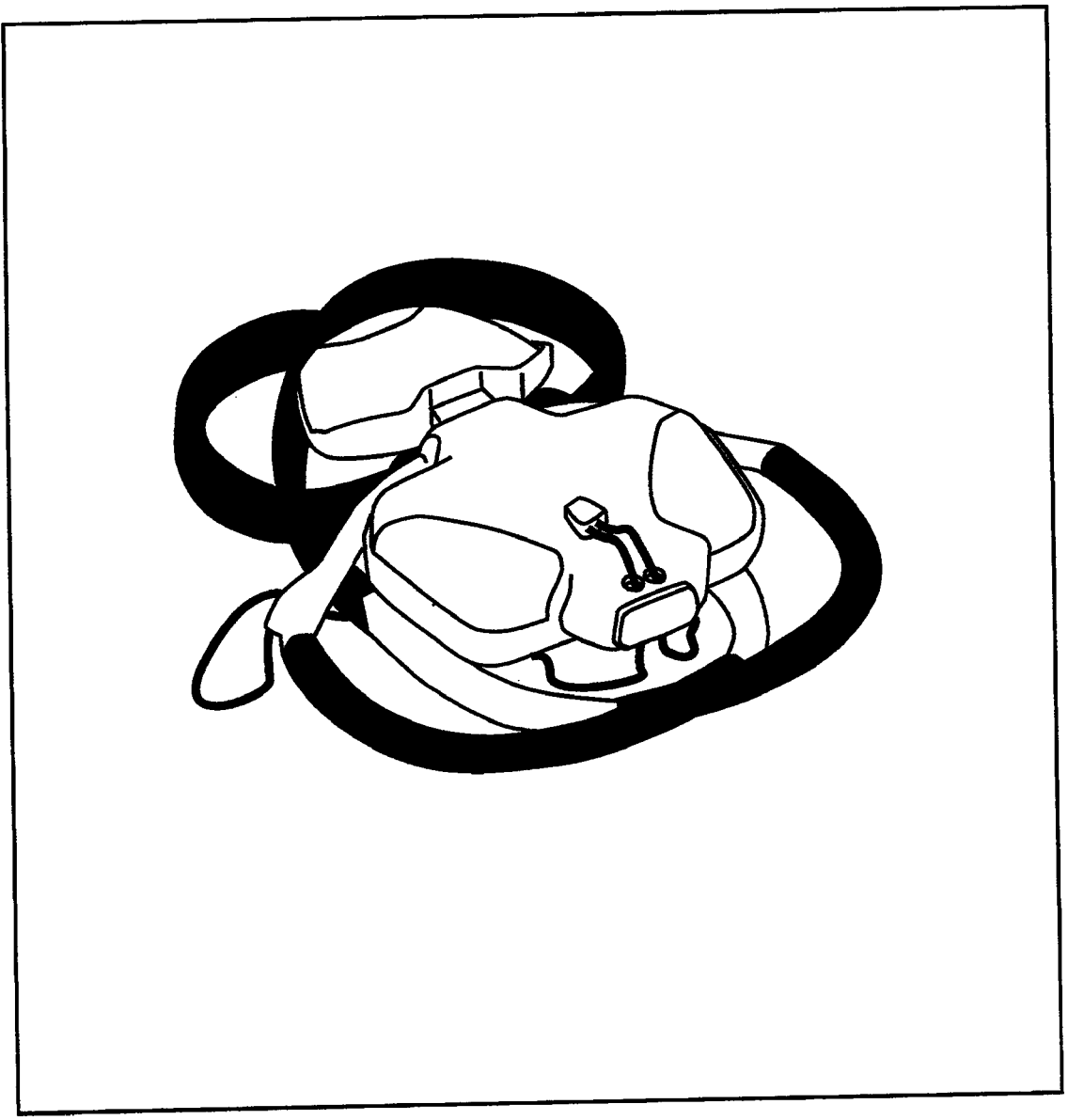
FIG. 21 is one embodiment of a headband comprising a battery pack and a lamp which can be affixed together so as to allow compact size.

FIG. 21 is an embodiment of a headband comprising a battery provided with a fixing means enabling the lamp to be fixed to this battery. This results in a possibility of "folding" the lamp in a particularly compact form.

As it has been seen above, the invention achieves many embodiments providing different possibilities of use in accordance with the user's requirements. FIG. 22 illustrates a configuration of the headlamp which can be positioned on any support, for example a deck or a table. The figures are given merely by way of illustration, are in no way limiting and clearly a person skilled in the art to adopt the new rigid/semi-rigid band in the production of a wide range of lamps.

What is claimed is:

1. A headlamp comprising:
    a lamp fitted with a light source;
    a headband allowing the fastening of the headlamp over the head of a user,
    wherein the headband has a constant length, symmetrical with respect to a median sagittal plane, and further comprises an alternation of rigid/semi rigid elements for allowing a deformation in the space and the adjustment on the user's head,
    wherein it comprises:
        a front section comprising a first semi-rigid element;
        a rear section comprising a rigid or semi-rigid element;
        a left branch comprising:
            a first rigid element having a first lower end and a second upper end; wherein said first rigid element has a higher rigidity than that of said front section or rear section; wherein the first end of said first rigid element is fixed to a first end of the front section and wherein said first rigid element comprises at its two lower and upper ends, respectively, a first and a second traversing hole configured to receive a first tightening elastic link;

a second semi-rigid element having a first end and a second end, wherein said first end of said second semi-rigid element is fixed at the second end of said first rigid element;

a third rigid element having a first end and a second end, and comprising a traversing hole configured to receive said first elastic link coming from the second traversing hole of said first element; wherein said first end of said third element is fixed at the second end of said second element;

a fourth semi-rigid element having a first end and a second end, wherein the first end of said fourth element is fixed at the second end of said third element;

a fifth rigid element having a first end and a second end, wherein the first end of said fifth element is fixed at the second end of said fourth element, wherein the second end of said fifth element is fixed at the first end of the rear section; wherein said fifth element allows the fixing of the elastic link coming from the first 5 passage hole of said first element;

a right branch comprising:

a sixth rigid member having a first lower end and a second upper end, wherein said sixth rigid member has a rigidity which is higher than that of said front section or rear section, wherein the first end of said sixth element is fixed to a second end of said front section, said sixth element comprising, respectively at its two lower and upper ends, a first and a second traversing holes configured to receive a second elastic link;

a seventh semi rigid element having a first end and a second end, wherein said first end of said seventh element is fixed to the second end of said sixth element;

a eighth rigid element having a first end and a second end and comprising a traversing hole configured to receive said second elastic link coming from the second traversing hole of said sixth element;

wherein the first end of said eighth element is fixed to the second end of said seventh element;

a ninth semi rigid element having a first end and a second end;

wherein the first end of said ninth element is fixed to the second end of said eighth element;

a tenth rigid element having a first end and a second end; wherein the first end of said tenth element is fixed to the second end of said ninth element; wherein the second end of said tenth element is fixed to a second end of the rear section; wherein said tenth element allows the fixing of the second elastic link coming from the first traversing hole of said sixth element.

2. The headlamp according to claim 1 wherein said headband comprises:

a rigid/semi-rigid front section allowing a certain deformability along a first plane (x, y);

a rigid/semi-rigid intermediate section allowing a certain deformability along a second plane (x, z);

a rigid/semi-rigid rear section allowing a certain deformability along a third plane (y, z);

wherein said headband comprises elements configured for the attachment and the passage of an elastic link for constraining the deformation of the rigid/semi rigid headband within the three planes.

3. The headlamp according to claim 2 wherein it comprises, at the rear, a battery pack for supplying current to the light source.

4. The headlamp according to claim 3, wherein it further includes a fixing system on the battery for allowing the folding and a compact packing of the headlamp.

5. The headlamp according to claim 1 wherein it comprises, at the rear, a signaling light.

6. The headlamp according to claim 2 wherein the headband is hollow and further comprises a plurality of electrical conductors for powering the light source and/or the control of the functionalities of the lamp.

7. The headlamp according to claim 2 wherein the headband incorporates one or more optical fibers for deviating to the rear part of the light generated by the light source or, alternatively, for deporting towards the front or the side part of the light beam generated by a rear signaling pack.

8. The headlamp according to claim 6 wherein said headband is fitted with switches and/or a display for the control of the functionalities of the headlamp.

9. The headlamp according to claim 1, wherein said headlamp comprises at least one pivot allowing the lamp to rotate on the front section of said headband, and configured for allowing a rotation of at least 180 degrees.

10. The headlamp according to claim 9 wherein the pivot allows to control the light beam of the lamp to provide an horizontal light beam, but also a light beam pointing downward, when the lamp is carried as a neckstrap/necklace.

11. The headlamp according to claim 1, wherein it further comprises a rear box which is movable so as to provide diverse possibilities of rear signaling.

12. A method of producing a headlamp comprising the steps of:

providing a lamp fitted with a light source;

providing a headband allowing the fastening of the headlamp over the head of a user, wherein the headband has a constant length, symmetrical with respect to a median sagittal plane, and further comprises an alternation of rigid/semi rigid elements for allowing a deformation in the space and the adjustment on the user's head;

wherein it comprises:

a front section comprising a first semi-rigid element;

a rear section comprising a rigid or semi-rigid element;

a left branch comprising:

a first rigid element having a first lower end and a second upper end; wherein said first rigid element has a higher rigidity than that of said front section or rear section; wherein the first end of said first rigid element is fixed to a first end of the front section and wherein said first rigid element comprises at its two lower and upper ends, respectively, a first and a second traversing hole configured to receive a first tightening elastic link;

a second semi-rigid element having a first end and a second end, wherein said first end of said second semi-rigid element is fixed at the second end of said first rigid element;

a third rigid element having a first end and a second end, and comprising a traversing hole configured to receive said first elastic link coming from the second traversing hole of aid first element; wherein said first end of said third element is fixed at the second end of said second element;

a fourth semi-rigid element having a first end and a second end, wherein the first end of said fourth element is fixed at the second end of said third element;

a fifth rigid element having a first end and a second end, wherein the first end of said fifth element is fixed at the second end of said fourth element, wherein the second end of said fifth element is fixed at the first end of the rear section; wherein said fifth element allows the fixing of the elastic link coming from the first 5 passage hole of said first element;

a right branch comprising:
  a sixth rigid member having a first lower end and a second upper end, wherein said sixth rigid member has a rigidity which is higher than that of said front section or rear section, wherein the first end of said sixth element is fixed to a second end of said front section, said sixth element comprising, respectively at its two lower and upper ends, a first and a second traversing holes configured to receive a second elastic link;
  a seventh semi rigid element having a first end and a second end, wherein said first end of said seventh element is fixed to the second end of said sixth element;
  a eighth rigid element having a first end and a second end and comprising a traversing hole configured to receive said second elastic link coming from the second traversing hole of said sixth element;
wherein the first end of said eighth element is fixed to the second end of said seventh element;
  a ninth semi rigid element having a first end and a second end;
wherein the first end of said ninth element is fixed to the second end of said eighth element;
  a tenth rigid element having a first end and a second end; wherein the first end of said tenth element is fixed to the second end of said ninth element; wherein the second end of said tenth element is fixed to a second end of the rear section; wherein said tenth element allows the fixing of the second elastic link coming from the first traversing hole of said sixth element.

13. The method according to claim 12 wherein said headband comprises:
  a rigid/semi-rigid front section allowing a certain deformability along a first plane (x, y);
  a rigid/semi-rigid intermediate section allowing a certain deformability along a second plane (x, z);
  a rigid/semi-rigid rear section allowing a certain deformability along a third plane (y, z);
wherein said headband comprises elements for the attachment and the passage of an elastic link for constraining the deformation of the rigid/semi rigid headband within the three planes.

14. The method according to claim 13 wherein it comprises, at the rear, a battery pack for supplying current to the light source.

15. The method according to claim 14 wherein it further includes a fixing system on the battery for allowing the folding and a compact packing of the headlamp.

16. The method according to claim 12 wherein it comprises, at the rear, a signaling light.

17. The method according to claim 13 wherein the headband is hollow and further comprises a plurality of electrical conductors for powering the light source and/or the control of the functionalities of the lamp.

18. The method according to claim 13 wherein the headband incorporates one or more optical fibers for deviating to the rear part of the light generated by the light source or, alternatively, for deporting towards the front or the side part of the light beam generated by a rear signaling pack.

19. The method according to claim 17 wherein said headband is fitted with switches and/or a display for the control of the functionalities of the headlamp.

20. The method according to claim 12, wherein said headlamp comprises at least one pivot allowing the lamp to rotate on the front section of said headband, and for allowing a rotation of at least 180 degrees.

21. The method according to claim 20 wherein the pivot allows to control the light beam of the lamp to provide an horizontal light beam, but also a light beam pointing downward, when the lamp is carried as a neckstrap/necklace.

22. The method according to claim 12, wherein it further comprises a rear box which is movable so as to provide diverse possibilities of rear signaling.

* * * * *